US009976679B2

(12) United States Patent
Uenishi et al.

(10) Patent No.: US 9,976,679 B2
(45) Date of Patent: May 22, 2018

(54) JOINT INCLUDING CONNECTION SURFACE, PIPE INCLUDING PIPE JOINT, AND PIPING STRUCTURE INCLUDING SAME

(71) Applicant: U-TEC Co., Ltd., Osaka (JP)

(72) Inventors: Yukio Uenishi, Osaka (JP); Yuji Kondo, Osaka (JP)

(73) Assignee: U-TEC Co., Ltd., Osaka (JP)

( * ) Notice: Subject to any disclaimer, the term of this patent is extended or adjusted under 35 U.S.C. 154(b) by 973 days.

(21) Appl. No.: 14/374,149

(22) PCT Filed: Jan. 22, 2013

(86) PCT No.: PCT/JP2013/051194
§ 371 (c)(1),
(2) Date: Jul. 23, 2014

(87) PCT Pub. No.: WO2013/111748
PCT Pub. Date: Aug. 1, 2013

(65) Prior Publication Data
US 2014/0367960 A1    Dec. 18, 2014

(30) Foreign Application Priority Data

Jan. 24, 2012 (JP) ................................ 2012-012010
Nov. 22, 2012 (JP) ................................ 2012-256318
Jan. 21, 2013 (JP) ................................ 2013-008319

(51) Int. Cl.
*F16L 43/00* (2006.01)
*F16L 23/026* (2006.01)
(Continued)

(52) U.S. Cl.
CPC ............ *F16L 23/026* (2013.01); *F16L 23/12* (2013.01); *F16L 39/06* (2013.01); *F16L 41/021* (2013.01);
(Continued)

(58) Field of Classification Search
CPC .............................. F16L 43/00; F16L 43/003
(Continued)

(56) References Cited

U.S. PATENT DOCUMENTS 4,080,752 A * 3/1978 Burge .................. A63H 33/042
                                                              285/179
5,845,386 A * 12/1998 Watts .................... F16L 23/032
                                                              285/179
(Continued)

FOREIGN PATENT DOCUMENTS

CN      101985925 A    3/2011
CN      201803015 U    4/2011
(Continued)

OTHER PUBLICATIONS

International Search Report for corresponding International Application No. PCT/JP2013/051194, dated Mar. 5, 2013 (2 pages).
(Continued)

*Primary Examiner* — Aaron M Dunwoody
(74) *Attorney, Agent, or Firm* — Osha Liang LLP

(57) ABSTRACT

A joint having connection surface has a main body including a first connection surface and a second connection surface, each of which is structured to connect to a connection target such as a port of hydraulic equipment, a piping, and a joint, the connection target having a path in which a hydraulic oil flows, a first opening end opened on the first connection surface and connecting to the path, first coupling holes each structured as a threaded hole, which are opened on the first connection surface and arranged on a circle concentric with the first opening end, a second opening end opened on the second connection surface and connecting to the path, and second coupling holes each structured as a through hole or
(Continued)

a threaded hole, which are opened on the second connection surface and arranged along a circle concentric with the second opening end.

2 Claims, 29 Drawing Sheets

(51) Int. Cl.

| | | |
|---|---|---|
| *F16L 23/12* | (2006.01) | |
| *F16L 41/02* | (2006.01) | |
| *F16L 41/03* | (2006.01) | |
| *F16L 41/08* | (2006.01) | |
| *F16L 39/06* | (2006.01) | |
| *E02F 9/22* | (2006.01) | |

(52) U.S. Cl.
CPC ............ *F16L 41/03* (2013.01); *F16L 41/086* (2013.01); *F16L 43/001* (2013.01); *F16L 43/005* (2013.01); *E02F 9/2275* (2013.01)

(58) Field of Classification Search
USPC ...................................... 285/179, 416, 124.5
See application file for complete search history.

(56) References Cited

U.S. PATENT DOCUMENTS

| | | | |
|---|---|---|---|
| 7,150,475 B2 * | 12/2006 | Eriksson ............. | F15B 13/0817 137/271 |
| 7,178,556 B2 * | 2/2007 | Reid, II ................ | F16K 27/003 137/271 |
| 2011/0285125 A1 | 11/2011 | Itafuji et al. | |
| 2014/0007958 A1 | 1/2014 | Itafuji et al. | |

FOREIGN PATENT DOCUMENTS

| | | |
|---|---|---|
| JP | 58-36688 | 3/1983 |
| JP | 61-0206187 U | 12/1986 |
| JP | 62-179486 U | 11/1987 |
| JP | 63-30686 A | 2/1988 |
| JP | H07-103374 A | 4/1995 |
| JP | 2011-241906 A | 12/2011 |
| WO | 2010/137138 A1 | 12/2010 |

OTHER PUBLICATIONS

International Preliminary Report on Patentability for corresponding International Application No. PCT/JP2013/051194, dated Apr. 28, 2014 (24 pages).
Partial English translation for Japanese Patent Publication No. H07-103374, Published Apr. 18, 1995 (2 pages).
Partial English translation for Japanese Patent Publication No. 58-36688, Published Mar. 10, 1983 (2 pages).
Extended European Search Report issued in corresponding European Application No. 13740657.5, dated Oct. 2, 2015 (6 pages).
Notification of Reasons for Rejection issued in corresponding Japanese Application No. 2013-008319, dated Nov. 10, 2015 (6 pages).
First Office Action issued in corresponding Chinese Application No. 201380006536.8, dated Jul. 1, 2015 (11 pages).
Second Office Action issued in corresponding Chinese Application No. 201380006536.8, dated Nov. 5, 2015 (10 pages).
English translation of International Preliminary Report on Patentability for International Application No. PCT/JP2013/051194, dated Apr. 28, 2014 (4 pages).

\* cited by examiner

Prior Art

Prior Art

Prior Art

Prior Art

Prior Art

JOINT INCLUDING CONNECTION SURFACE, PIPE INCLUDING PIPE JOINT, AND PIPING STRUCTURE INCLUDING SAME

TECHNICAL FIELD

The present invention relates to a pipe including a joint and a pipe joint having a connection surface and to a piping structure, each of which is used for piping in a structure of a hydraulic circuit configured to feed and discharge an actuation pressure oil from a pressure fluid source to hydraulic equipment such as a water gate of a dam, a movable weir on a river, a hydraulic cylinder serving as a driver used for driving an industrial machine, and a hydraulic motor.

BACKGROUND ART

Hydraulic equipment, such as a water gate of a dam, a movable weir on a river, a hydraulic cylinder for driving an industrial machine, and a hydraulic motor, is set up nearby a driven unit. This is because actuation pressure oil from the pressure fluid source is supplied to and discharged from a driven unit of a water gate, a movable weir, a tide gate, an industrial machine, and the like via a hydraulic circuit so as to actuate the same.

The pressure fluid source is a device in which a pressure-oil tank, a hydraulic pump, an electronic device configured to supply and discharge the actuation pressure oil to/from the hydraulic equipment, or a switch valve and the like are integrated. Since such a pressure fluid source is vulnerable to rain and wind, and since the entire device may not operate due to damages to the pressure fluid source, a building is provided and the pressure fluid source is set up within the building. This causes the distance from the pressure fluid source to the hydraulic equipment to be long.

The hydraulic circuit from the pressure fluid source to the hydraulic equipment is structured by weld-joint, to a socket which is a socket-weld type pipe joint, an end portion of a steel pipe structuring the hydraulic circuit, the pipe having a straight pipe portion of a regulated length (approximately 6 meters). The bent-pipe portion is formed by bending the steel pipe by a bender and its end portion is welded to a socket. For a curvature of a radius that cannot be processed by a bender or for branches, an elbow, a Tee, or a cross each of which is a socket-weld type joint is used according to the site of piping to structure the hydraulic circuit.

As shown in FIG. 16 which illustrates the pipe and the socket before and after assembly, a socket 50 of a socket-weld type pipe joint structuring the straight pipe portion has pipe insertion holes 52 and 53 at end portions on both side of a main body 51 having a straight pipe shape. To these pipe insertion holes are inserted end portions 55a and 56a of pipes 55 and 56 structuring the hydraulic circuit, respectively.

Between the pipe insertion holes 52 and 53 is provided a protruding portion 54 which forms a reduced diameter hole 54a whose diameter corresponds to the inner diameter of the pipes 55 and 56. Between the protruding portion 54 and the pipe insertion holes 52 and 53 are contact surfaces 52a and 53a. With the socket 50, the pipe 55, and the pipe 56, a straight pipe portion in the hydraulic circuit is structured as follows. Namely, taking the pipe 55 for example, the pipe 55 is inserted into the pipe insertion hole 52 until the end portion 55a of the pipe 55 abuts the contact surfaces 52a as shown on the right side of FIG. 16, and the outer circumference of the pipe 55 and the socket 50 are welded at a weld portion 58, as shown on the left side of FIG. 16.

As shown in FIG. 17 which illustrates the pipe and elbow before and after assembly, an elbow 60 of the socket-weld type pipe joint structuring the bent-pipe portion has, at the both ends of the main body 61 in a shape of a bent pipe, pipe insertion holes 62 and 63. To these pipe insertion holes 62 and 63 are inserted end portions 65a and 66a of pipes 65 and 66 structuring the hydraulic circuit, respectively. Between the pipe insertion holes 62 and 63 are provided a protruding portion 64 which forms a reduced diameter hole 64a whose diameter corresponds to the inner diameter of the pipes 65 and 66. Between the protruding portion 64 and the pipe insertion holes 62 and 63 are contact surfaces 62a and 63a.

With this elbow 60, a bent-pipe portion in the hydraulic circuit is structured as follows. Namely, an end portion 65a of the pipe 65 is inserted until its leading end portion abuts the contact surfaces 62a, and then the outer circumference of the pipe 65 and the main body 61 in the shape of a bent pipe are welded to each other at a weld portion (similar to weld portion 68). Meanwhile, an end portion 66a of the pipe 66 is inserted until its leading end portion abuts the contact surfaces 63a, and then the outer circumference of the pipe 66 and the main body 61 in the shape of a bent pipe are welded to each other at a weld portion 68.

As hereinabove mentioned, the socket 50 and the elbow 60 for structuring a straight pipe portion and a bent-pipe portion of a piping structure by, for example, inserting an end portion (end portions 55a, 56a, 65a, and 66a) of a pipe (pipe 55, 56, 65, and 66) into a pipe insertion hole (pipe insertion holes 52, 53, 62, and 63), and welding the outer circumference of the pipe to the socket 50 or the elbow 60.

In the piping structure, for example, the diameter of the pipe insertion hole of the pipe joint, to which an end portion of a pipe is inserted, is slightly greater (by approximately 0.5 mm in the nominal diameter 20A) than the outer diameter of the pipe for the sake of workability. This creates a gap A between the outer circumference of the pipe and the pipe insertion hole. Therefore, the surface of the pipe is oxidized by the heat from welding of the pipe inserted and the pipe joint, and this oxidized surface remains as an oxidized layer on the surface of the pipe, i.e., in the gap A.

Such an oxidized layer is thin and sharp, and is extremely hard since it is an oxide of iron. During the operation of the hydraulic device, the oxide may depart the gap A and become a foreign matter, which floats within the pressure oil and circulates the hydraulic line. The foreign matter may enter the hydraulic equipment, the control valves, and the hydraulic equipment, and may damage the sliding surfaces, consequently leading to a malfunction.

Further, the hydraulic oil is subject to a high pressure, for the purpose of driving the hydraulic equipment. Further, through the hydraulic equipment, water or air may enter the hydraulic line, and actuation of the hydraulic pump, valves, and cylinders may cause entrance of various foreign matters such as metal powder and residues caused by damages to sealing.

The various foreign matters such as the air and water, which are mixed into the hydraulic oil, activate the hydraulic oil with an increase in the temperature caused by operation of the hydraulic equipment, and becomes a contaminant such as resin and sludge which deteriorates the hydraulic oil and the function of the hydraulic equipment.

As shown in FIG. 18 (*a*) and FIG. 18 (*b*), PTL 1 discloses a structure in which a weld width h is arranged between an end portion 76a of a pipe 76 inserted into a pipe insertion hole 73 of a pipe joint 70 and a contact surface 73a of the pipe insertion hole 73, and a gap A between the pipe insertion hole 73 and the outer circumference of the pipe 76 is sealed by welding at the weld portion 79. Further, FIG. 19 shows a structure in which a weld width h is arranged between an end portion 86a of a pipe 86 inserted into a pipe insertion hole 83 of a pipe joint 80 and a contact surface 83a of the pipe insertion hole 83, and a gap between the outer circumference of the pipe 86 and the pipe insertion hole 83 is sealed by welding at the weld portion 89.

The above connection structure of the pipe joint 70 and the pipe 76 indeed seals the foreign matters remaining in the gap A. However, it is the end portion 76a of the pipe 76 and the contact surfaces 73a which are welded at the weld portion 79 within the weld width h, there will be a gap h1 between the end portion 76a and the contact surfaces 73a. It should be noted that a gap h1 is also formed in the connection structure of the pipe joint 80 and the pipe 86, as shown in FIG. 19.

The piping structure 70c of the straight pipe shown in FIG. 19 is identical to the piping structure having the pipe joint 70, and the piping structure having the pipe joint 80 is fastened by hexagon socket head cap bolts 82.

It should be noted that the pipe joint 70 has four coupling holes 71a provided along a circle concentric with the connection hole 74. Further, the pipe joint 80 to be screw-fastened to the pipe joint 70 has coupling holes 81a in positions corresponding to the four coupling holes 71a, respectively. Further, the coupling holes 71a and the coupling holes 81a have a threaded hole structure and a threaded through-hole structure; i.e., where one of them has a threaded hole structure, the corresponding counterpart has the threaded through-hole structure. These structures are stipulated in JISB2291.

In the case of the pipe joint 70 and the pipe joint 80, the coupling holes 71a on the pipe joint 70 are through holes, while the coupling holes 81a on the pipe joint 80 is structured as a female screw. Further, an O-ring 72 for sealing the pipe joint 70 and the pipe joint 80 is arranged on the connection surface 77 of the pipe joint 70. The other structures are substantially the same, and therefore descriptions are provided but details are omitted as needed.

In the piping structure 70C of a straight pipe structured by fastening the pipe joint 70 and the pipe joint 80 by using the four hexagon socket head cap bolts 82, there will gaps h1 in number corresponding to the number of pipe joints used in the piping structure structuring the straight pipe.

CITATION LIST

Patent Literature

[PTL 1] Japanese Unexamined Patent Publication No. 103374/1995 (Tokukaihei 7-103374)

SUMMARY OF INVENTION

In the case of the pipe with the pipe joint 70 disclosed in PTL 1, the end portion of the pipe is inserted into the pipe insertion hole on the pipe joint, and the weld portion 78 and the weld portion 79 which are leading and trailing ends of the inserted portion are welded seal the gap A formed between the pipe insertion hole and the pipe. Therefore, foreign matters such as the oxide layer in the gap A do not flow into the hydraulic circuit. However, since there are a plurality of gaps h1, i.e., recesses (in number corresponding to the number of pipe joints), the various foreign matters described above and air may be accumulated in the recesses, causing early deterioration of the hydraulic oil.

The piping structuring the hydraulic circuit adopts the above described socket-weld type joints such as sockets 50, elbows 60, tees, and crosses, along with the pipe joint 70. These socket-weld type joints have a structure such that the pipe insertion hole and an end portion of the pipe cannot be welded, there will be a gap A which is opened within the pipe. For this reason, foreign matters such as an oxidation layer generated by welding of the piping are not fully prevented from being mixed into the pressure oil.

Technical Solution

One or more embodiments of the present invention includes a joint having connection surface, comprising a main body including: a first connection surface and a second connection surface, each of which is structured to connect to a connection target such as a port of hydraulic equipment, a piping, and a joint, the connection target having a path in which a hydraulic oil flows; a first opening end opened on the first connection surface and connecting to the path; first coupling holes each structured as a threaded hole, which are opened on the first connection surface and arranged on a circle concentric with the first opening end; a second opening end opened on the second connection surface and connecting to the path; second coupling holes each structured as a through hole or a threaded hole, which are opened on the second connection surface and arranged along a circle concentric with the second opening end; and a communication path communicating the first opening end with the second opening end, wherein: arrangement of the first communication holes and that of the second communication holes of the main body are made identical to each other, a first plane including the first connection surface of the main body is perpendicular to a second plane including the second connection surface, the first connection surface is a square with the first opening end as its center, and the second connection surface is a rectangle including a square identical to the foregoing square with the second opening end as the center of the square, the rectangle having one side longer than a side of the square by a depth of the first coupling holes.

The above described joint having a connection surface has a smooth passage without a gap or a weld portion in the communication path and on the connection surface, and thereby brings about an effect of preventing a space causing stagnation of foreign matters or the air which causes contamination.

One or more embodiments of the present invention includes a pipe with a pipe joint, including the pipe structuring piping, the pipe including at its one end portion of the pipe, a first side pipe joint including a first side pipe insertion hole into which the one end portion of the pipe is inserted with a gap between the first side pipe insertion hole and the one end portion of the pipe, a first side connection hole serially provided to the first side pipe insertion hole and having a diameter corresponding to an inner diameter of the pipe, a first side connection surface on which the first side connection hole is opened, a sealing groove on the first side connection surface, which is arranged on a periphery of the first side connection hole, and coupling through holes arranged on the outer periphery of the sealing groove, along a circle concentric with the first side connection hole, wherein the first side pipe joint is fixed by welding an inner surface of the one end portion of the pipe and the inner surface of the first side connection hole, and welding the outer circumference of the pipe and the first side pipe insertion hole; and including at its another end portion of the pipe, a second side pipe joint including a second side pipe insertion hole into which said another end portion of the pipe is inserted with a gap between the second side pipe insertion hole and said another end portion of the pipe, a second side connection hole serially provided to the second side pipe insertion hole and having a diameter corresponding to the inner diameter of the pipe, a second side connection surface on which the second side connection hole is opened, and threaded coupling holes arranged on the second side connection surface along a circle concentric with the second side connection hole, which are in positions corresponding to those of the coupling through holes, wherein the second side pipe joint is fixed by welding an inner surface of said another end portion of the pipe and the inner surface of the second side connection hole, and welding the outer circumference of the pipe and the second side pipe insertion hole.

The above-described pipe having a pipe joint is structured by inserting an end portion of the pipe into the pipe insertion hole and welding the inner surface of the connection hole, and no recess is formed on the inner surface of the pipe having the pipe joint. This seals foreign matters by welding, while forming a smooth passage, and reduces the stress applied by the hydraulic pressure acting on the outer circumference of the pipe and the weld portion of the joint.

One or more embodiments of the present invention is a piping structure, including a joint having a connection surface, including a main body including: a first connection surface and a second connection surface, each of which is structured to connect to a connection target such as a port of hydraulic equipment, a piping, and a joint, the connection target having a path in which a hydraulic oil flows, a first opening end opened on the first connection surface and connecting to the path, first coupling holes each structured as a threaded hole, which are opened on the first connection surface and arranged on a circle concentric with the first opening end, a second opening end opened on the second connection surface and connecting to the path, second coupling holes each structured as a through hole or a threaded hole, which are opened on the second connection surface and arranged along a circle concentric with the second opening end, and a communication path communicating the first opening end with the second opening end, wherein arrangement of the first communication holes and that of the second communication holes of the main body are made identical to each other, a first plane including the first connection surface of the main body is perpendicular to a second plane including the second connection surface, the first connection surface is a square with the first opening end as its center, the second connection surface is a rectangle including a square identical to the foregoing square with the second opening end as the center of the square, the rectangle having one side longer than a side of the square by a depth of the first coupling holes; and a pipe with a pipe joint including the pipe structuring piping, the pipe including at its one end portion of the pipe, a first side pipe joint including a first side pipe insertion hole into which the one end portion of the pipe is inserted with a gap between the first side pipe insertion hole and the one end portion of the pipe, a first side connection hole serially provided to the first side pipe insertion hole and having a diameter corresponding to an inner diameter of the pipe, a first side connection surface on which the first side connection hole is opened, a sealing groove on the first side connection surface, which is arranged on a periphery of the first side connection hole, and coupling through holes arranged on the outer periphery of the sealing groove, along a circle concentric with the first side connection hole, wherein the first side pipe joint is fixed by welding an inner surface of the one end portion of the pipe and the inner surface of the first side connection hole, and welding the outer circumference of the pipe and the first side pipe insertion hole; and including at its another end portion of the pipe, a second side pipe joint including a second side pipe insertion hole into which said another end portion of the pipe is inserted with a gap between the second side pipe insertion hole and said another end portion of the pipe, a second side connection hole serially provided to the second side pipe insertion hole and having a diameter corresponding to the inner diameter of the pipe, a second side connection surface on which the second side connection hole is opened, and threaded coupling holes arranged on the second side connection surface along a circle concentric with the second side connection hole, which are in positions corresponding to those of the coupling through holes, wherein the second side pipe joint is fixed by welding an inner surface of said another end portion of the pipe and the inner surface of the second side connection hole, and welding the outer circumference of the pipe and the second side pipe insertion hole, the connection surface of the joint having the connection surface and the pipe joint of the pipe with a pipe joint being fixed by means of threaded-coupling.

The above-described piping structure structured by the joint having the connection surface and the pipe having the pipe joint prevents generation of foreign matters, and forms piping with smooth inner surface without a recess. This structure brings about an effect of preventing stagnation of foreign matters.

Advantageous Effects

The pipe structure, the connection-surface-formed joint of the present invention needed in a piping site structures a smooth passage without forming on its inner surface a smooth passage a recess or a gap which causes stagnation of foreign matters. Therefore, simply circulating hydraulic oil at a low pressure enables removal of foreign matters and the air inside the passage. Further, since no welding work is necessary at any part in the piping work, it is possible to manufacture all the parts at a plant.

BRIEF DESCRIPTION OF DRAWINGS

FIG. 1 (c) is a partial enlarged view of the pipe relative to the first example of the present invention.

FIG. 1 (d) is a cross sectional view of a piping structure relative to the first example of the present invention.

FIG. 1 (e) is a front view of a connection surface 41 of a connection-surface-formed joint, relative to the first example of the present invention.

FIG. 9(*b*) is a cross sectional view of an intermediate joint relative to the ninth example of the present invention.

FIG. 13 (*b*) is a cross sectional view of a piping structure relative to a thirteenth example of the present invention.

FIG. 14(*b*) is a front view of a connection surface 41*r*1 of a connection-surface-formed joint relative to the fourteenth example of the present invention.

FIG. 14 (*c*) is a cross sectional view of a piping structure of a fifteenth example.

FIG. 18(*b*) is a partially enlarged cross sectional view of a traditional pipe structure.

DETAILED DESCRIPTION

Figure 1A:
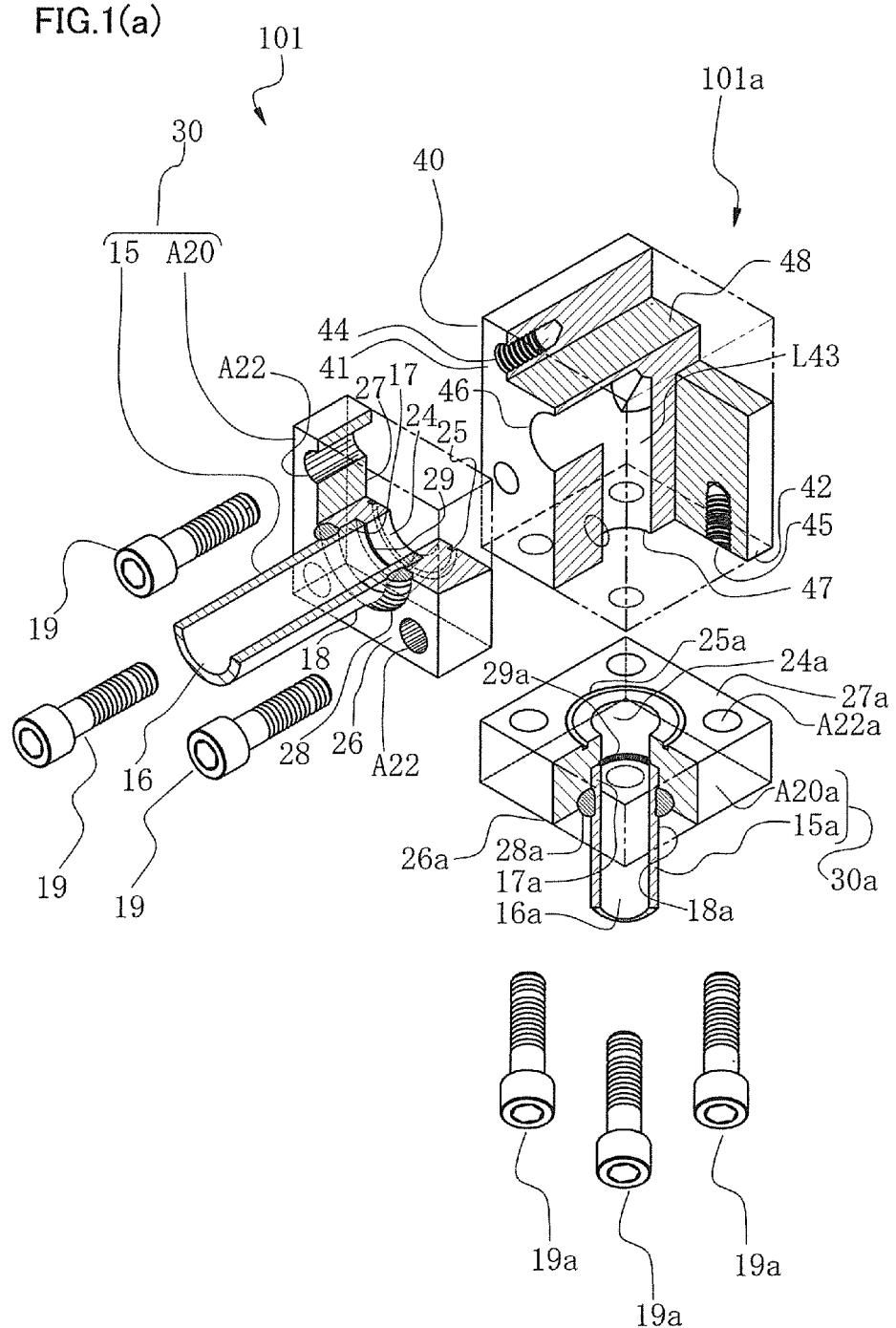
FIG. 1 (a) is a perspective diagram of a piping structure relative to a first example of the present invention.
FIG. 1(b) is a partial perspective diagram of the pipe relative to the first example of the present invention.
FIG. 1(f) is a front view of a connection surface 42 of the joint with the connection surface, relative to the first example of the present invention.
Figure 1B:
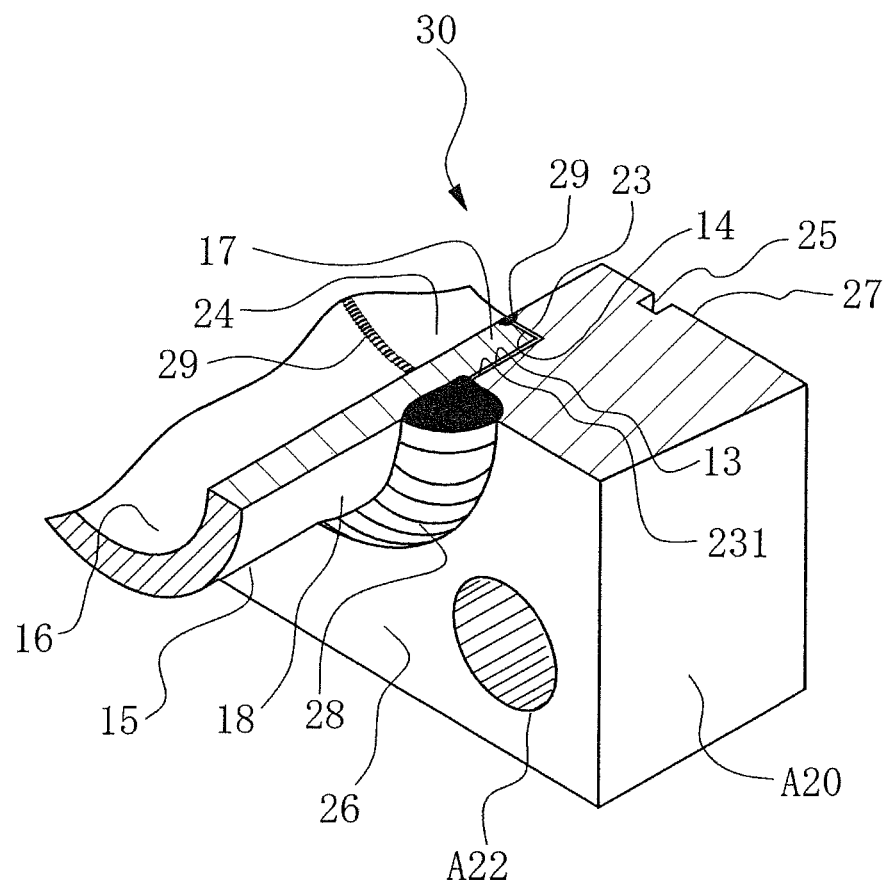
Figure 1C:
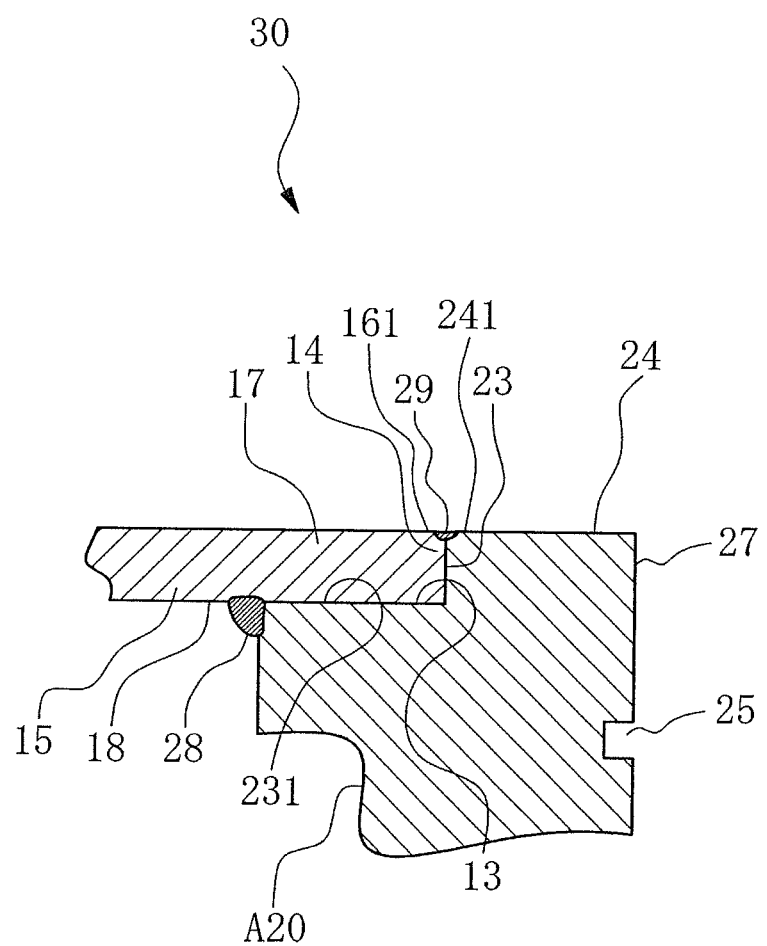
Figure 1D:
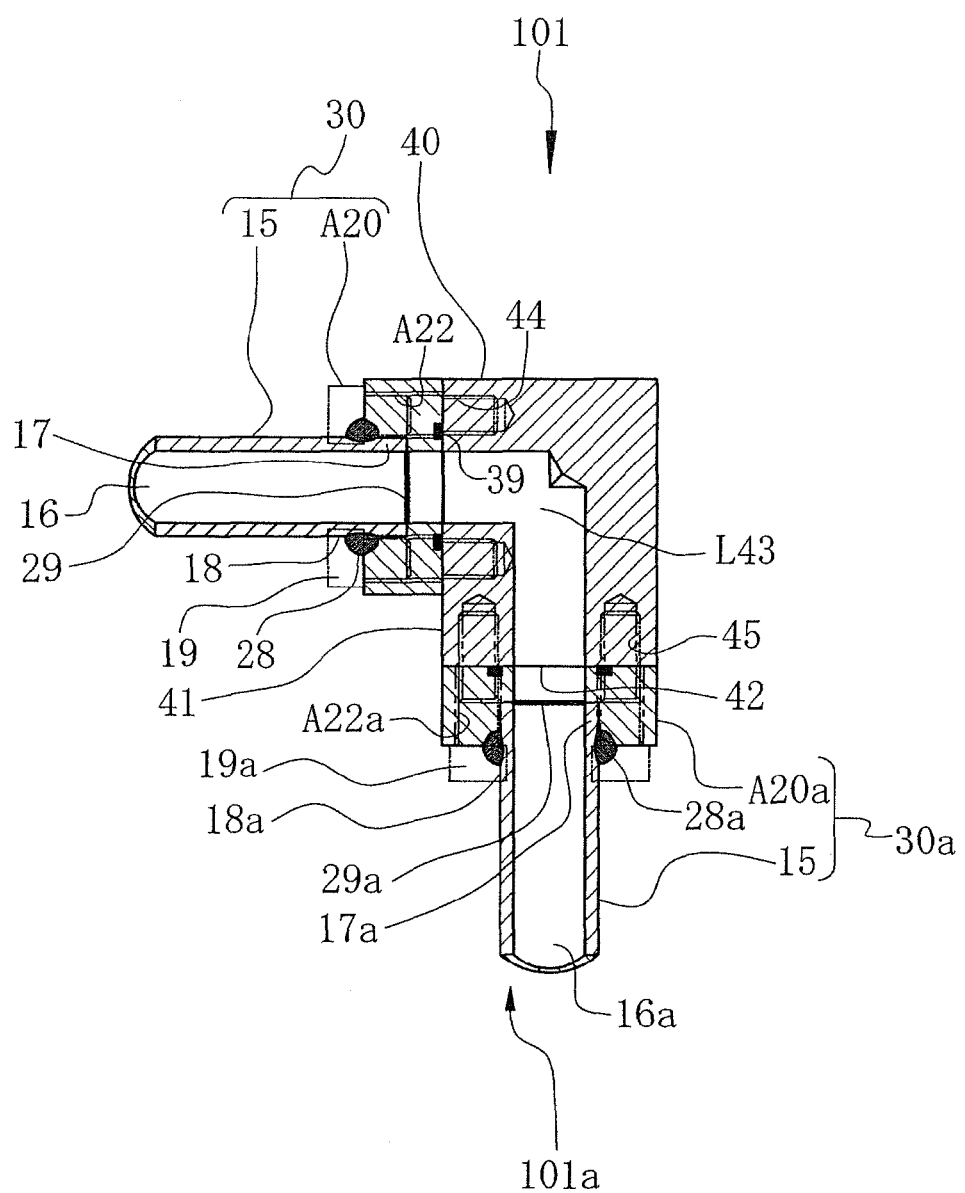
Figure 1E:
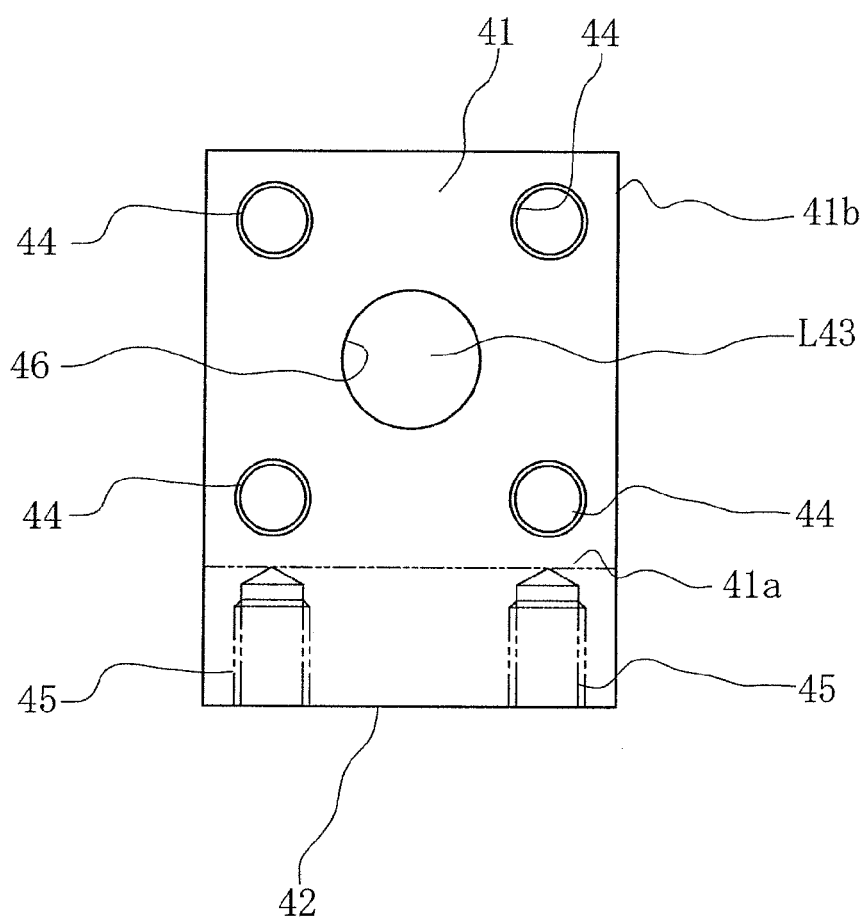
Figure 1F:
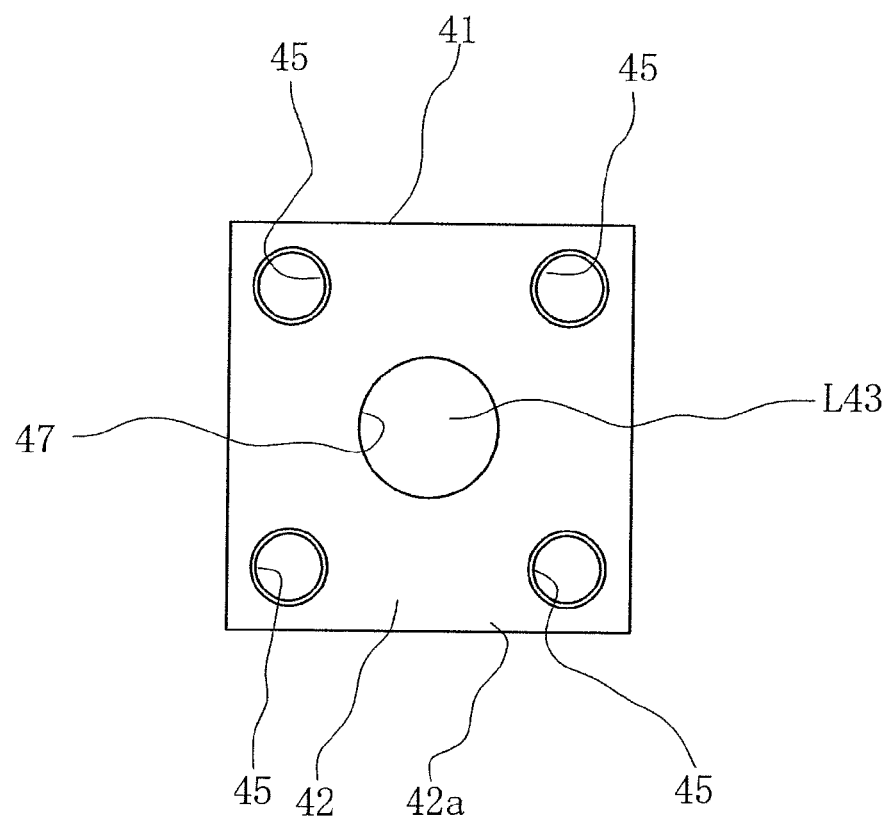

Embodiments of the present invention are described below with reference to the drawings. Note that, in the drawings showing examples of the present invention, the same numerals are given to the similar parts and an upper case alphabet symbol is given before the number to distinguish one from another. Further, in each example, members need to be described are given an alphabet symbol after the numeral. For other members, a reference symbols are given and explanations may be omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Further, in the description of each of the examples of the present invention, an alphabet symbol is accompanied after numeral symbol and explanation may be omitted. Further, the sizes and structures in each example are in compliance with JISB2219.

Figure 12:
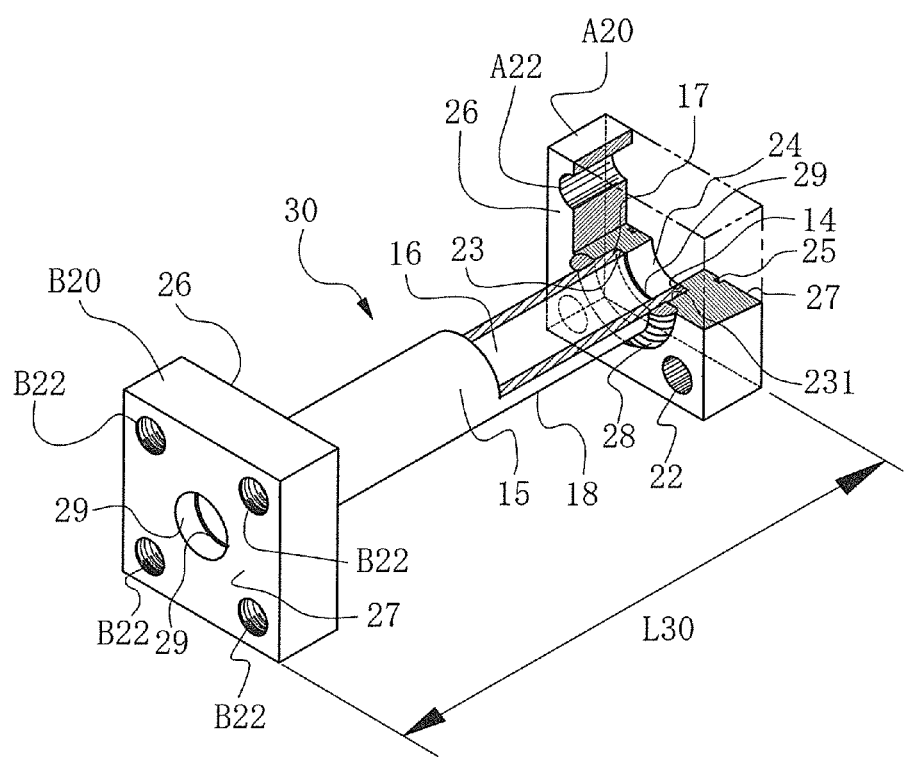
FIG. 12 is a perspective diagram of a pipe structure relative to an example of the present invention.

A piping structure 101 shown in FIG. 1 (*a*) to (*d*), which is a first example of the piping structure, includes a pipe (hereinafter, pipe structure) 30 and a joint 40 having a connection surface (hereinafter, connection-surface-formed joint 40). As shown in FIG. 12, the pipe structure 30 includes a pipe 15 structuring the piping of a hydraulic circuit. To one end portion of this pipe 15 is fixed a pipe joint (hereinafter, joint structure) A20; and to another end portion of the same is fixed a pipe joint (hereinafter, joint structure) B20 to be connected to the joint structure A20. The connection-surface-formed joint 40 includes connection surfaces 41, 42 to be connected, by four hexagon socket head cap bolts 19, to a connection surface 27 or a connection surface 27*a* of the joint structure A20 or the joint structure B20 of the pipe structure 30.

It should be noted that the piping structure on the right side portion of the piping structure 101 shown in FIG. 1 (*d*), structured by the connection-surface-formed joint 40 and the pipe structure 30*a* are hereinafter referred to as right side piping structure 101*a*.

As shown in FIG. 1 (*e*), the connection surface 41 of the connection-surface-formed joint 40 includes coupling holes 44 which are four threaded holes arranged along a circle concentric with an opening end 46 of an L-shaped communication path L43, and are in positions corresponding to the coupling holes A22 of the joint structure A20. The connection surface 41 is a rectangle 41*b* including a square 41*a* (a square indicated by using the virtual line of FIG. 1 (*e*)) with the opening end 46 at the center. One side of the rectangle 41*b* is longer than one side of the square 41*a* at least by the depth of threaded coupling holes 45.

As shown in FIG. 1 (*f*), the connection surface 42 of the connection-surface-formed joint 40 is formed flush with a second plane perpendicular to a first plane including the connection surface 41, and is a square 42*a* with an opening end 47 at the center. The connection surface 42 has four threaded coupling holes 45 which are arranged along a circle concentric with the opening end 47 of the L-shaped communication path L43, and are in positions matching with the coupling through holes A22 of the joint structure A20. It should be noted that the square 41*a* and the square 42*a* are identical to each other.

Of the coupling hole 44 and the coupling hole 45, the coupling hole 45 is formed as a threaded hole, and the coupling hole 44 is formed so as not to interfere the threaded coupling hole 45. This way, it is possible to form the coupling hole 44 as a through hole or a threaded hole.

One of the connection surfaces 41 and 42 constitutes a first connection surface while the other constitutes a second connection surface. A plane including this first connection surface is the first plane, and a plane including the second connection surface is the second plane.

As described, while the first connection surface and the first plane correlate to each other and the second connection surface and the second plane correlate to each other, the connection surface 41 and the connection surface 42 do not relate to each other; where one of them is the first connection surface, the other is the second connection surface.

The first plane including the connection surface 41 of the connection-surface-formed joint 40 and the second plane including the connection surface 42 of the same, which are shown in FIG. 1 (*f*) and FIG. 1 (*e*), respectively, are perpendicular to each other.

The joint structure A20 provided to one end portion of the pipe structure 30 shown in FIG. 12 is a pipe joint having coupling through holes A22 each formed as a through hole for coupling. The joint structure B20 provided to the other end portion is a pipe joint having threaded coupling holes B22 each of which is a coupling hole formed as a threaded hole.

The pipe structure 30 shown in FIG. 12 is a basic structure of a straight pipe portion of a circuit, which is structured by connecting the joint structures A20 and the joint structures B20 of a plurality of pipe structures 30 by using hexagon socket head cap bolts 19.

The pipe structure 30 shown in FIG. 12 is structured by the joint structure A20 fixed to one end of the pipe 15, and a joint structure B20 fixed to the other end of the pipe 15. The joint structure A20 has coupling through holes A22 each of which is a through hole to which a hexagon socket head cap bolt 19 is inserted, and a groove 25 to which an O-ring 39 is inserted, the groove 25 being opened on the connection surface 27. The joint structure B20 has coupling holes B22 which are threaded holes provided in positions corresponding to the coupling through holes A22, and which are for threaded-coupling using the hexagon socket head cap bolts 19.

The joint structure A20 and the joint structure B20 are connected by threaded-coupling and fastening the hexagon socket head cap bolt 19 inserted to the coupling through hole A22 to the threaded coupling hole B22. At this time, the portions of the connection surfaces 27 facing each other are sealed by the O-ring 39 inserted to the groove 25.

O-ring 39 is structured so as to be inside the coupling through hole A22, and is always provided on the connection surface of the joint structure A20 so as to comply with Japanese Industrial Standards (JIS).

That is, the pipe structure 30 structures piping of a straight pipe by coupling the joint structure A20 and the joint structure B20 with the hexagon socket head cap bolt 19. It should be noted that the structures of the joint structure A20 and the joint structure B20 are in compliance with JISB2219.

The joint structure A20 of the pipe structure 30 includes: a pipe insertion hole 231 to which an end portion 17 of the pipe 15 is inserted so as to form a gap therebetween, a connection hole 24 having a diameter corresponding to the inner diameter 16 of the pipe 15; a contact surfaces 23 formed between the connection hole 24 and the pipe insertion hole 231 and facing the leading end 14 of the end portion 17; and a plurality of coupling through holes A22 provided around the connection hole 24 and enable the hexagon socket head cap bolt 19 to penetrate therethrough.

The joint structure B20 has the same structure as the joint structure A20 except in that the coupling through holes A22 of the joint structure A20 are replaced with the threaded coupling hole B22, and that the groove 25 is omitted. Thus, the joint structure B20 is connected to the joint structure A20 by threaded-coupling the hexagon socket head cap bolts 19 inserted into the coupling through holes A22 of the joint structure A20 to the holes B22.

The pipe 15 and the joint structure A20 are structured as follows. Namely, as shown in FIG. 1 (b), and FIG. 1 (c), an end portion 17 of the pipe 15 is inserted into the pipe insertion hole 231 of the joint structure A20, and the outer circumference 18 of the pipe 15 and a back surface 26 of the joint structure 20 are welded at a weld portion 28. There is also a weld portion 29 in which the inner surface of the leading end 14 of the end portion 17 of the pipe 15 and the inner surface of the contact surfaces 23 are welded or soldered (brass solder, silver solder, and the like).

As described, the end portion 17 of the pipe 15 is inserted to the joint structure A20 and welded, and the diameter of the pipe insertion hole 231 of the joint structure A20 is slightly greater than the outer circumference 18 of the pipe 15 (by approximately 0.5 mm). Therefore, although a gap 13 (corresponding to the foregoing gap A) is formed, the gap 13 is closed by the weld portion 28 and the weld portion 29.

At the weld portion 29 closing the gap 13, the inward surface 241 at the inner end of the connection hole 24 and the inward surface 161 of the end portion 17 are welded, the gap 13 is reliably closed, as shown in FIG. 1 (c). Further, since the weld portion 29 has a smooth surface resulting from cooling of the molten metal, the weld portion 29 forms a smooth passage that prevents foreign materials from being caught therein.

It should be noted that a weld portion between the joint structure A20 at one end portion of the pipe structure 30 and the pipe 15, and a weld portion between the joint structure B20 on the other end portion and the pipe 15 have substantially the same structure as those shown in FIGS. 1 (b) to (c), and therefore detailed description is omitted.

The connection-surface-formed joint 40 of the piping structure 101 of the first example, which is shown in FIG. 1 (a) includes: a main body 48; the connection surface 41 and the connection surface 42 provided perpendicularly to the main body 48; and an elbow type connection-surface-formed joint 40, having an L-shaped communication path L43 opened to the connection surface 41 and the connection surface 42.

The L-shaped communication path L43 of the elbow type connection-surface-formed joint 40 has an opening end 46 and an opening end 47 which open at the center of the connection surface 41 of the main body 48 and at the center of the connection surface 42 perpendicular to the connection surface 41, respectively. The connection surface 41 and the connection surface 42 have coupling holes 44 arranged along the circumference of the opening end 46, in positions corresponding to the coupling through holes A22 on the joint structure A20; and coupling holes 45 arranged along the circumference of the opening end 47, in positions corresponding to the coupling through holes A22a on the joint structure A20a, respectively.

The groove 25 provided on the connection surface 27 of the pipe structure 30 and the groove 25a provided on the connection surface 27a of the pipe structure 30a, each of which shown in FIG. 1 (a), are grooves for inserting therein O-rings 39 and 39a. The connection-surface-formed joint 40, the pipe structure 30, and the pipe structure 30a of the piping structure 101 is manufactured and subjected to acid cleaning in a plant to remove all the foreign matters inside. Then, the connection surfaces are closed by curing and stored.

Figure 2:
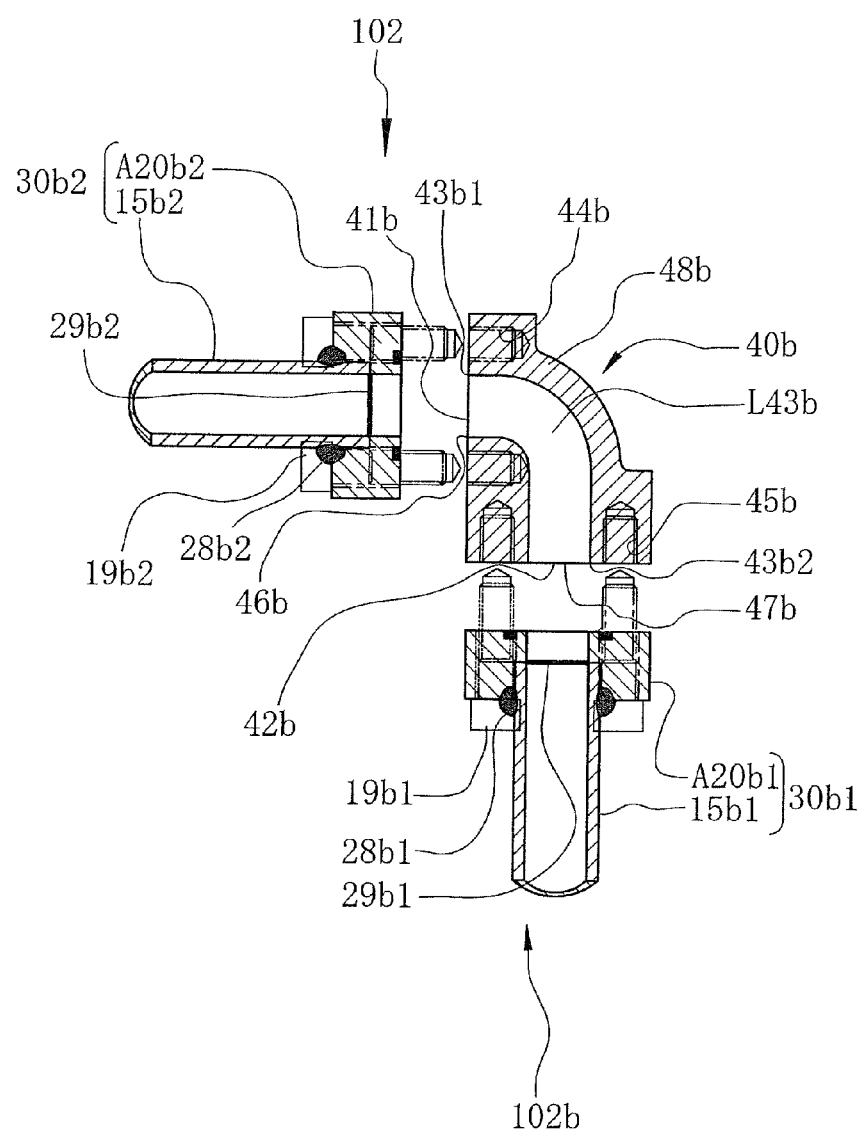
FIG. 2 is a cross sectional view of a piping structure relative to a second example of the present invention.

To structure the piping structure 101, the connection-surface-formed joint 40 and the pipe structures 30 and 30a stored free of the foreign matters are transported to a piping site. Then, the curing is taken off from the connection-surface-formed joint 40 and the pipe structures 30 and 30a. Then, the connection-surface-formed joint 40 and the pipe structures 30 and 30a are assembled as shown in FIG. 2.

More specifically, to assemble the pipe structure 30 and the connection-surface-formed joint 40 having been stored in the plant, the curing is first taken off. Then, an O-ring is inserted into the groove 25 of the pipe structure 30. Subsequently, hexagon socket head cap bolts 19 are inserted into the coupling holes A22, and the leading ends of the bolts are screwed and fastened to the threaded coupling holes 44 on the main body 42 of the connection-surface-formed joint 40, thereby fixing the pipe structure 30 and the connection-surface-formed joint 40, to each other.

Similarly, to attach and assemble the pipe structure 30a to the connection surface 42 of the connection-surface-formed joint 40, the curing is first taken off, and an O-ring is inserted in to the groove 25a of the pipe structure 30a. Then, hexagon socket head cap bolts 19a are inserted and the leading ends of the bolts are screwed and fastened to the threaded coupling holes 45 on the main body 48 of the connection-surface-formed joint 40, thereby fixing the pipe structure 30a to the connection surface 42 of the connection-surface-formed joint 40.

With the piping structure 101 structured as described above, there is no way of having a foreign matter enter throughout the work, as long as a caution is paid to keep away the foreign matter at the time of taking off the curing during the assembly. Further, the foreign matters are not generated in conditions such as a welding work in which case visual recognition of the foreign matter is not possible, and are visually recognizable. Therefore, it is possible to keep away the foreign matters by paying attention.

The right side piping structure 101a of the piping structure 101 having the pipe structure 30a and the connection-surface-formed joint 40 connected to each other is a basic structure for the other examples.

A piping structure 102 of a second example shown in FIG. 2 and the piping structure 101 of the first example are different in that the connection-surface-formed joint 40b is formed by casting.

Namely, of the connection-surface-formed joint 40b, a main body 48b and an L-shaped communication path L43b are manufactured by casting, and the connection surface 41b, the connection surface 42b, and the threaded coupling holes 44b and 45b are formed by machining.

Since the L-shaped communication path L43b of the main body 48b of the connection-surface-formed joint 40b is formed by casting, the L-shaped communication path L43b having one end opened on the connection surface 41b and the other end opened on the connection surface 42b may have a curve as shown in FIG. 2. This realizes a smooth passage preventing stagnation of the flow of the hydraulic oil.

A pipe structure 30b2 to be connected to the connection surface 41b of the connection-surface-formed joint 40b and a pipe structure 30b1 to be connected to the connection surface 42b of the same have the same structure as those described in the first example. Namely, the connection surface 41b is similar to the one shown in FIG. 1 (e) and the connection surface 42b is similar to the one shown in FIG. 1 (f). Therefore, detailed description is omitted.

The piping structure 102 is an elbow piping structure, structured by connecting the pipe structure 30b2 and the pipe structure 30b1 to the connection surface 41b and the connection surface 42b of the connection-surface-formed joint 40b, with a use of hexagon socket head cap bolts 19b2 and hexagon socket head cap bolts 19b1, respectively.

This piping structure 102 of the second example forms an extremely smooth passage, because there is no recesses or stepwise portions on the inner surfaces of the pipe structure 30b1, the pipe structure 30b2, or the L-shaped communication path L43b of the connection-surface-formed joint 40b.

The smoothness of the passage prevents stagnation of the air and foreign matters which is caused by having the air and foreign mater caught in the passage. Therefore, simply circulating the hydraulic oil at a low pressure cleans the passage. This reduces the number of flushing at a high pressure.

Reference is made to a right side piping structure 102b of the piping structure 102 in which the pipe structure 30b1 and the connection-surface-formed joint 40b are connected, in the description of the other examples.

Figure 3:
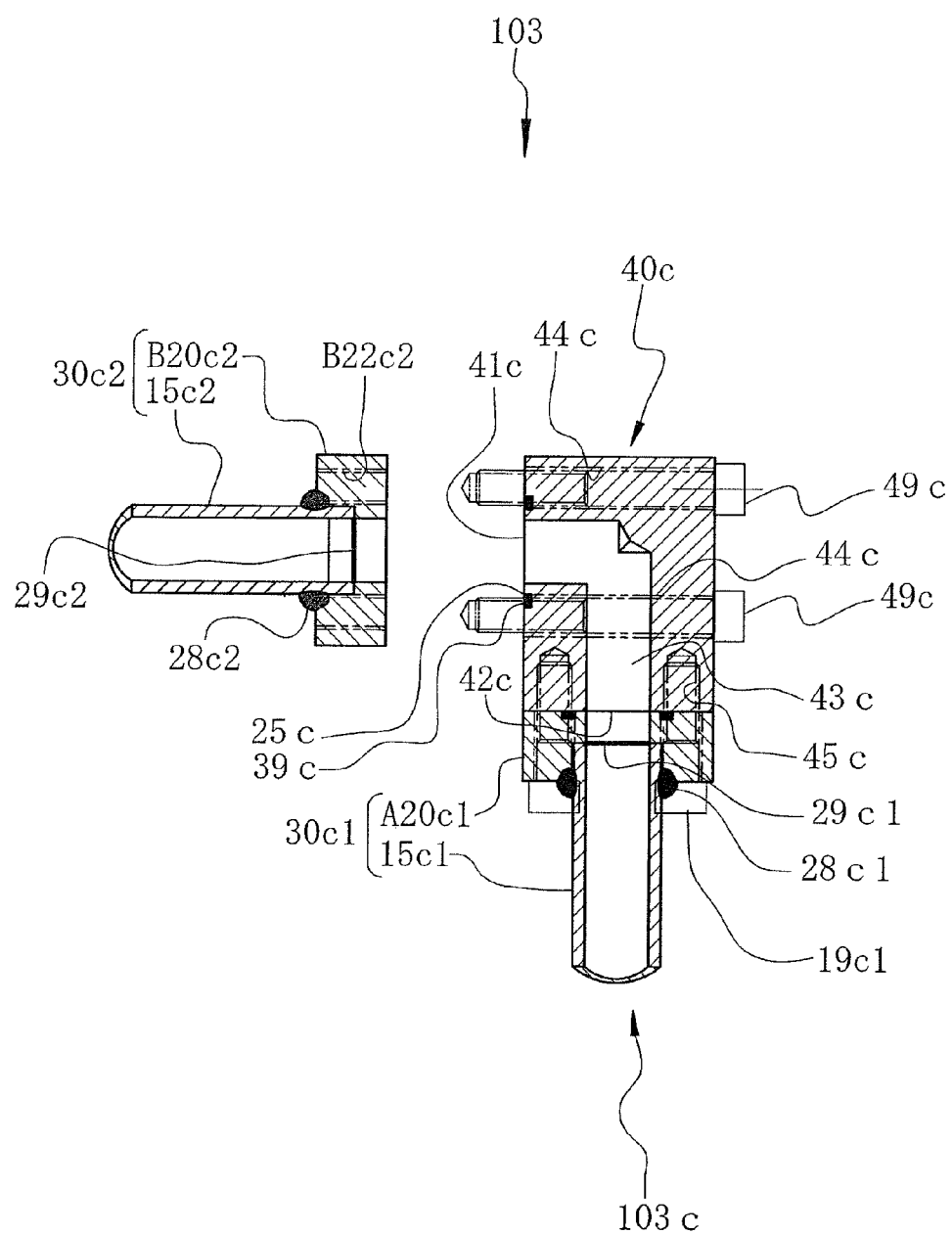
FIG. 3 is a cross sectional view of a piping structure relative to a third example of the present invention.

The piping structure 103 of a third example shown in FIG. 3 is such that a pipe structure 30c2 is attached to the right side piping structure 103c, and that a pipe 15c1 and a pipe 15c2 are an elbow piping.

The right side piping structure 103c has substantially the same structure as the right side piping structure 101a of the piping structure 101 shown in FIG. 1 (d) except in that a connection-surface-formed joint 40c has coupling through holes 44c opened on the connection surface 41c, and that the connection surface 41c having the openings of the coupling holes 44c is provided with a groove 25c for inserting therein an O-ring 39c.

The pipe structure 30c2 to be connected to the connection surface 41c has a joint structure B20c2 having threaded coupling holes B22c2 corresponding to the coupling through holes 44c.

This piping structure 103 includes the right side piping structure 103c and the pipe structure 30c2 connected thereto by hexagon socket head cap bolts 49c penetrating the coupling holes 44c on the connection surface 41c of the connection-surface-formed joint 40c.

This piping structure 103, when used on a site in combination with the first example shown in FIG. 1 (d), allows connection of either the joint structure A20c1 of the pipe structure 30c1 and the joint structure B20c2 of the pipe structure 30c2. Therefore, the piping structure 103 is adoptable in various scenes of the piping site.

That is, the first example is such that two joint structures A 20 and A20a are connected to the connection-surface-formed joint 40. The third example however is a structure for connecting the joint structure B20c2 and the joint structure A20c1. Therefore, there is brought about an effect that the different joint structures are adoptable by selectively using these structures on a piping site.

It should be noted that the right side piping structure 103c of the piping structure 103, in which the pipe structure 30c1 and the connection-surface-formed joint 40c are connected to each other, is a basic structure of another example.

Figure 4:
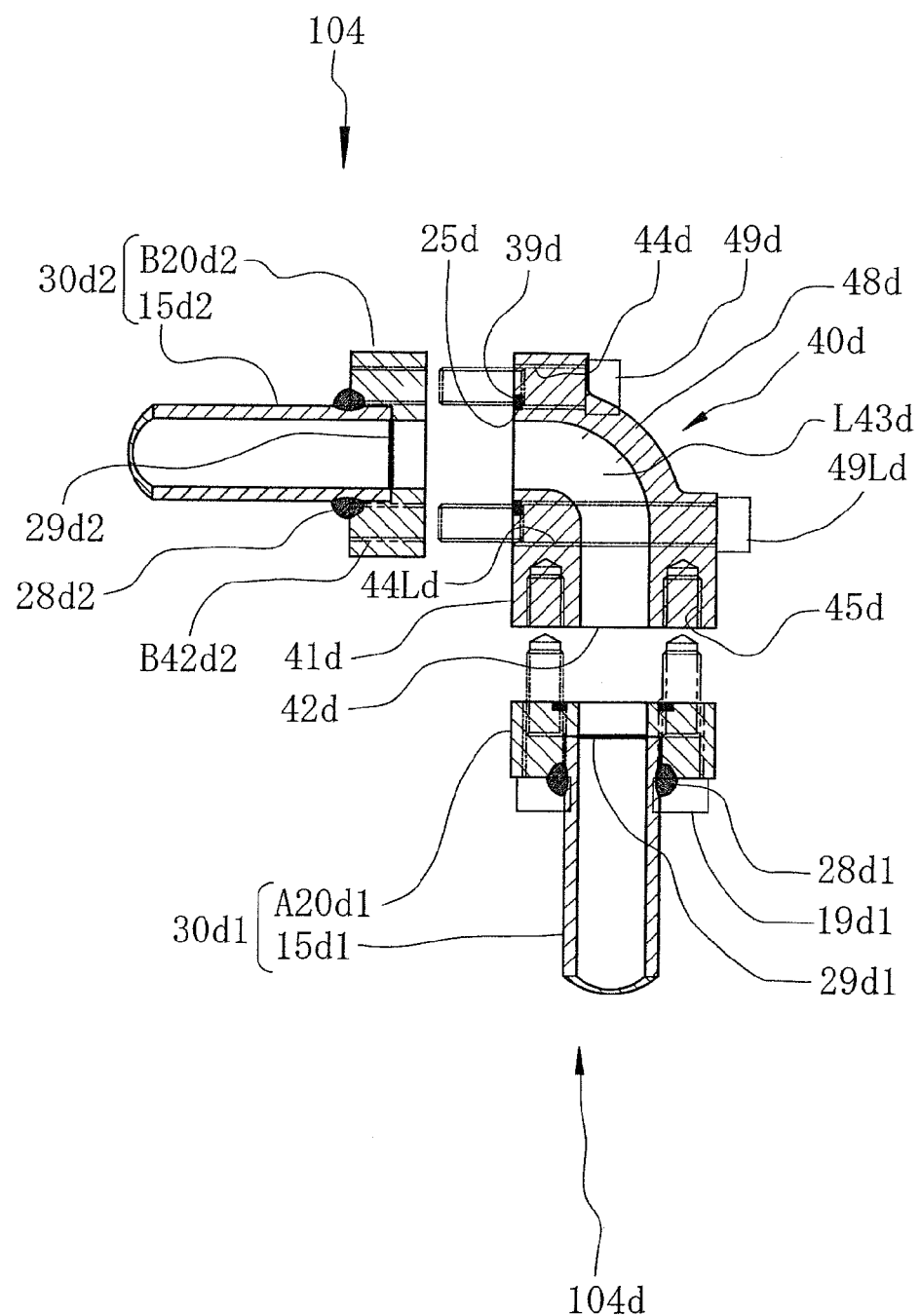
FIG. 4 is a cross sectional view of a piping structure relative to a fourth example of the present invention.

A piping structure 104 of a fourth example shown in FIG. 4 has substantially the same structure as the piping structure 102 of the second example shown in FIG. 2 except in that the threaded coupling holes 44b opened on the connection surface 41b of the connection-surface-formed joint 40b of the piping structure 102 are coupling through holes 44d; that the connection surface 41d having the openings of the coupling holes 44d is provided with a groove 25d for inserting therein an O-ring 39d; and that the joint structure B20 shown in FIG. 12 is adopted as a joint structure B20d2 of a pipe structure 30d2 so as to match with the connection surface 41d.

The piping structure 104 is structured by connecting the pipe structure 30d2 having the joint structure B20d2 to the connection surface 41d by using hexagon socket head cap bolts 49d and hexagon socket head cap bolts 49Ld longer than the hexagon socket head cap bolts 49d; and connecting a pipe structure 30d1 having the joint structure A20 to the connection surface 42d by using hexagon socket head cap bolts 19d1.

The right side piping structure 104d of the piping structure 104, in which the pipe structure 30d1 and the connection-surface-formed joint 40d are connected to each other, is a basic structure of another example.

The piping structure 104 having such a structure is used on a piping site in combination with the piping structure 102 of the second example shown in FIG. 2. For example, the second example shown in FIG. 2 is such that the joint structure A20b1 and the joint structure A20b2 are connected to the connection-surface-formed joint 40b. However, the fourth example shown in FIG. 4 allows connection of the joint structure B20c2 and the joint structure A20c1. Therefore, there is brought about an effect that the different joint structures are adoptable by selectively using these structures on a piping site.

The piping structure 104 of the fourth example forms an extremely smooth passage, because it has no recess or portions with uneven levels on the inner surfaces of the passages in the pipe structure 30d1 and the pipe structure 30d2, and on the inner surface of the L-shaped communication path L43d of the connection-surface-formed joint 40d. The smoothness of the passage prevents stagnation of the air and foreign matters which is caused by having the air and foreign mater caught in the passage. Therefore, simply circulating the hydraulic oil at a low pressure cleans the passage. This reduces the number of flushing at a high pressure.

Figure 5:
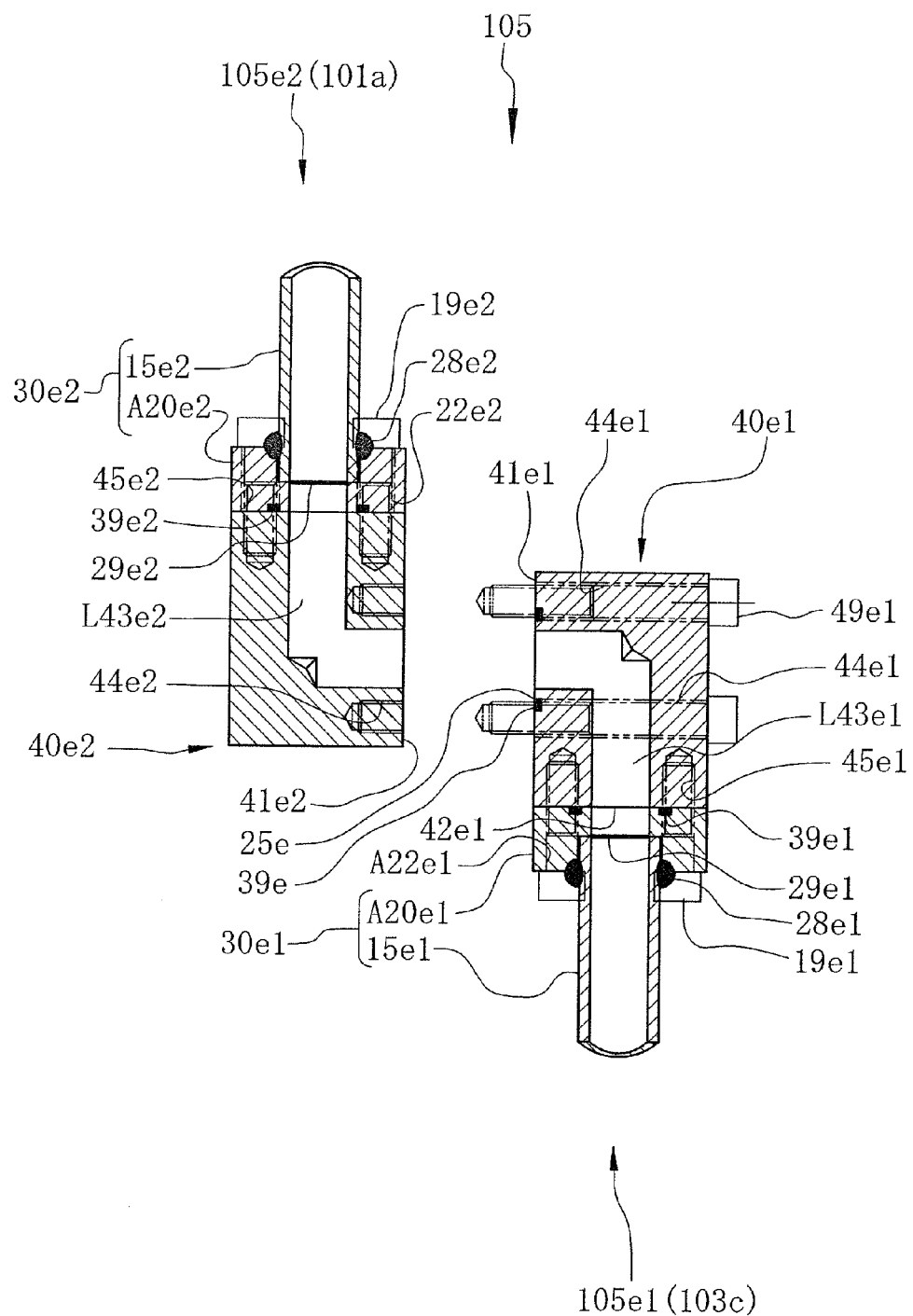
FIG. 5 is a cross sectional view of a piping structure of a fifth example of the present invention.

A piping structure 105 of a fifth example shown in FIG. 5 is a substantially S-shaped piping used, for example, in adjustment of stepped portions. The piping structure 105 includes a right side piping structure 105e1 having a pipe 15e1 and a left side piping structure 105e2 having a pipe 15e2, and the pipe 15e1 and a pipe 15e2 form a substantially S-shaped piping as shown in the figure.

The right side piping structure 105e1 has the same structure as that of the right side piping structure 103c of the third example shown in FIG. 3, and the left side piping structure 105e2 has the same structure as that of the right side piping structure 101a of the first example shown in FIG. 1 (d). Therefore, detailed descriptions are omitted.

In the fifth example shown in FIG. 5, the right side piping structure 105e1 is structured by connecting the pipe structure 30e1 to the connection-surface-formed joint 40e1 by using hexagon socket head cap bolts 19e1, and the left side piping structure 105e2 is structured by connecting the pipe structure 30e2 to the connection-surface-formed joint 40e2 by using hexagon socket head cap bolts 19e2, respectively.

The piping structure 105 of the fifth example is structured by connecting the connection surface 41e1 of the right side piping structure 105e1 and the connection surface 41e2 of the left side piping structure 105e2, with a use of a plurality of hexagon socket head cap bolts 49e1.

In the piping structure 105 of the fifth example, the connection-surface-formed joint 40e1 and the connection-surface-formed joint 40e2 are connected so that the directions of the pipe 15e1 and the pipe 15e2 are opposite to each other, and the interval therebetween is the pitch of the two joint structures A20e1 and A20e2, i.e., the minimum dimension.

As described, the interval between the pipe 15e1 and the pipe 15e2 arranged parallel to each other is the pitch of the two joint structures A20e1 and A20e2, i.e., the minimum dimension. This interval may be widened by interposing an intermediate joint between the connection surface 41e1 and the connection surface 41e2. Further, when the arrangement of the pipes 15e1 and 15e2 needs to be angled, adjustment of the angle is possible by interposing therebetween an angled intermediate joint.

Figure 6:
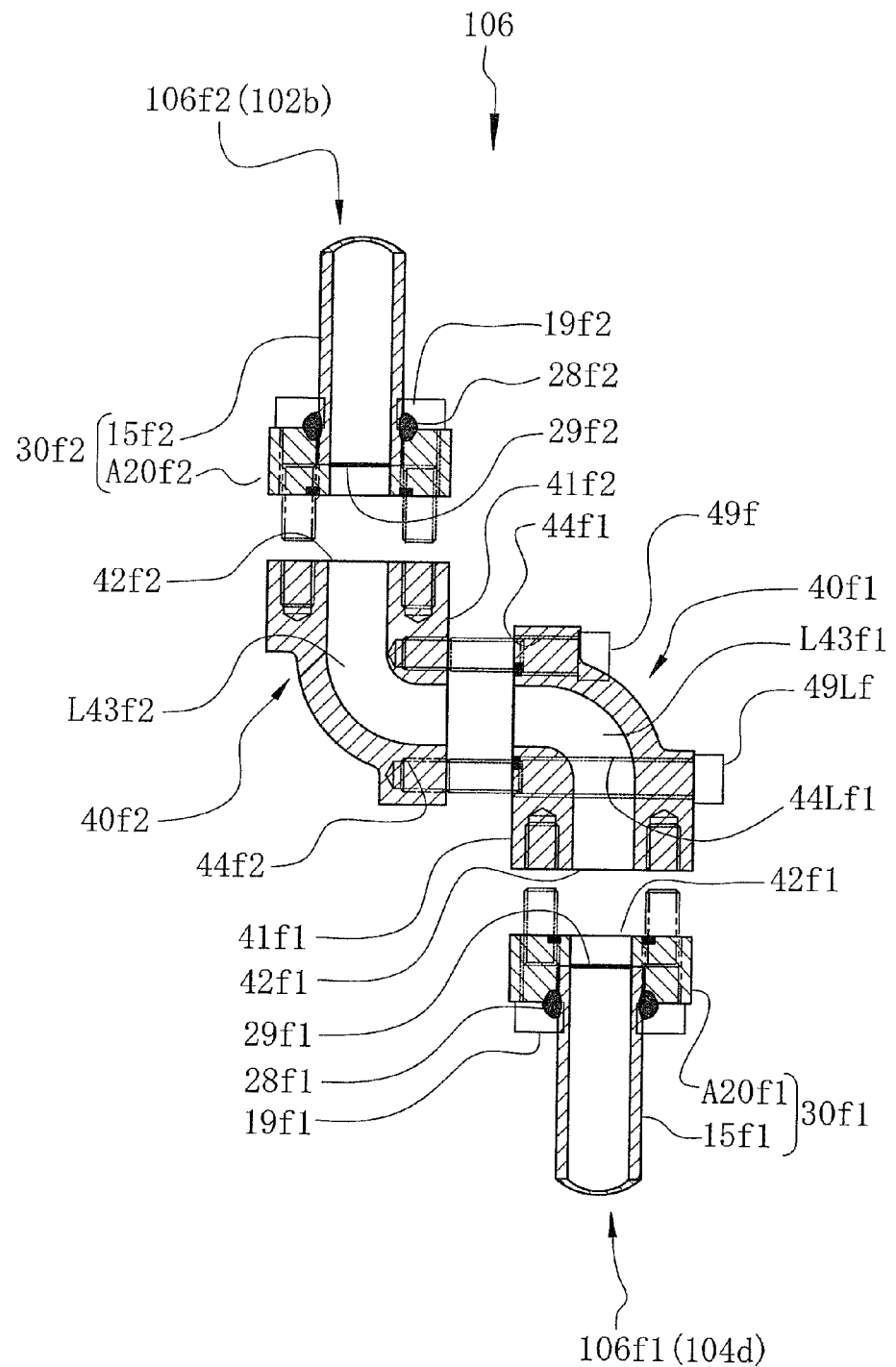
FIG. 6 is a cross sectional view of a piping structure of a sixth example of the present invention.

A piping structure 106 of a sixth example shown in FIG. 6 is a substantially S-shaped piping used, for example, in adjustment of stepped portions, as in the case of the fifth example shown in FIG. 5. The piping structure 105 includes a right side piping structure 106f1 having a pipe 15f1 and a left side piping structure 106f2 having a pipe 15f2, and the pipe 15f1 and the pipe 15f2 form a substantially S-shaped piping as shown in the figure.

The right side piping structure 106f1 has substantially the same structure as that of the right side piping structure 104d of the fourth example shown in FIG. 4, and the left side piping structure 106f2 has substantially the same structure as that of the right side piping structure 102b of the second example shown in FIG. 2. Therefore, detailed descriptions are omitted.

The right side piping structure 106f1 is structured by connecting the pipe structure 30f1 to the connection-surface-formed joint 40f1 by using hexagon socket head cap bolts 19f1, and the left side piping structure 106f2 is structured by connecting the pipe structure 30f2 to the connection-surface-formed joint 40f2, by using hexagon socket head cap bolts 19f2.

The piping structure 106 is structured by connecting the connection surface 41f1 of the right side piping structure 106f1 and the connection surface 41f2 of the left side piping structure 106f2, by using hexagon socket head cap bolts 49Lf and hexagon socket head cap bolts 49f, respectively.

In this piping structure 106 of the sixth example, the pipe 15f1 and the pipe 15f2 are connected to form stepped piping, via the connection-surface-formed joint 40f1 and the connection-surface-formed joint 40f2. The pipe 15f1 and the pipe 15f2 are parallel to each other and the interval therebetween is the pitch of the joint structure A20f1 and the joint structure A20f2, i.e., the minimum dimension.

As described, the interval between the pipe 15f1 and the pipe 15f2 parallel to each other is the pitch of the two joint structures A20f1 and A20f2, i.e., the minimum dimension. Therefore, the interval is adjustable with insertion of an intermediate joint between the connection surface 41f1 and the connection surface 41f2. Further, when the arrangement of the pipes 15f1 and 15f2 needs to be angled, the adjustment of the angle is possible by interposing therebetween an angled spacer.

The piping structure 106 is structured by connecting the right side piping structure 106f1 and the left side piping structure 106f2, and the pipe 15f1, the L-shaped communication path L43f1, the L-shaped communication path L43f2, the pipe 15f1, and the pipe 15f2 form a smooth passage without uneven inner surfaces. This prevents stagnation of foreign matters and air.

Figure 7:
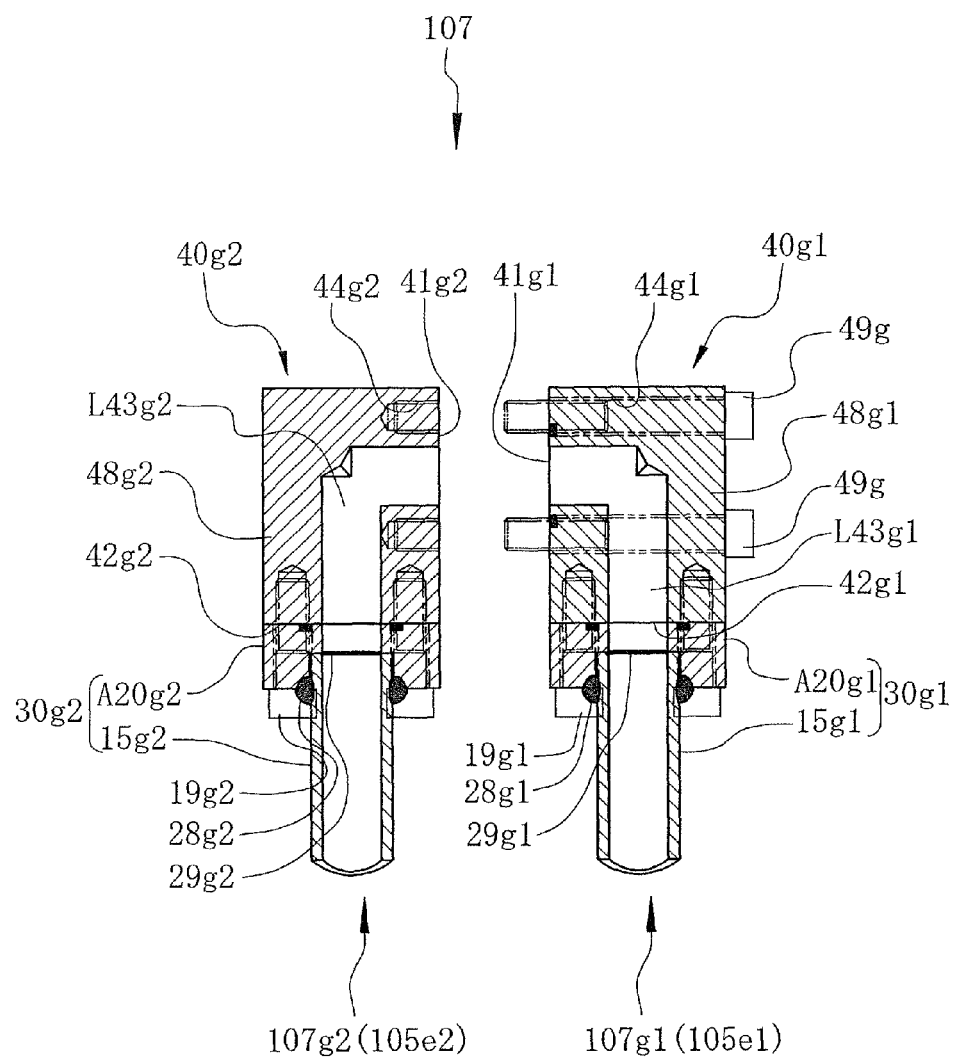
FIG. 7 is a cross sectional view of a piping structure of a seventh example of the present invention.

A piping structure 107 of a seventh example shown in FIG. 7 is a U-shaped piping for turning the piping to another direction. The piping structure 107 includes a right side piping structure 107g1 having a pipe 15g1 and a left side piping structure 107g2 having a pipe 15g2, and the pipe 15g1 and the pipe 15g2 form a U-shaped piping.

The right side piping structure 107g1 has the same structure as that of the right side piping structure 105e1 of the fifth example shown in FIG. 5, and the left side piping structure 107g2 has the same structure as that of the right side piping structure 105e2 of the fifth example shown in FIG. 5. Therefore, detailed descriptions are omitted.

The right side piping structure 107g1 of the piping structure 107 is structured by connecting a pipe structure 30g1 to a connection-surface-formed joint 40g1 by using hexagon socket head cap bolts 19g1, and the left side piping structure 107g2 is structured by connecting a pipe structure 30g2 to a connection-surface-formed joint 40g2 by using hexagon socket head cap bolts 19g2.

The piping structure 107 is structured by connecting the connection surface 41g1 of the right side piping structure 107g1 and the connection surface 41g2 of the left side piping structures 107g2 by using hexagon socket head cap bolts 49g.

The piping structure 107 is a structure in which the connection-surface-formed joint 40g1 and the connection-surface-formed joint 40g2 are connected to each other in such a manner that the pipe 15g1 and the pipe 15g2 run in the same direction, and is a structure in which the pipe 15e2 of the left side piping structure 105e2 of the fifth example shown in FIG. 5 is directed to the direction of the pipe 15g1 of the piping structure 107 to form a U-shaped piping.

The interval between the pipe 15g1 and the pipe 15g2 arranged in a U-shape is the pitch of the two joint structures A20g1 and A20g2, i.e., the minimum dimension. Therefore, the interval is adjustable with insertion of an intermediate joint between the connection surface 41g1 and the connection surface 41g2. Further, the when the arrangement of the pipes 15g1 and 15g2 needs to be angled, the adjustment of the angle is possible by interposing therebetween an angled spacer.

The piping structure 107 is an example in which the connection-surface-formed joint 40e2 of the fifth example is rotated by 180 degrees to direct the pipe 15g1 and the pipe 15g2 in the same direction. It is also possible to structure a stepped elbow piping by connecting the right side piping structure 107/1 and the left side piping structure 107/2, with the connection-surface-formed joint 40e2 rotated by 90 degrees.

Figure 8:
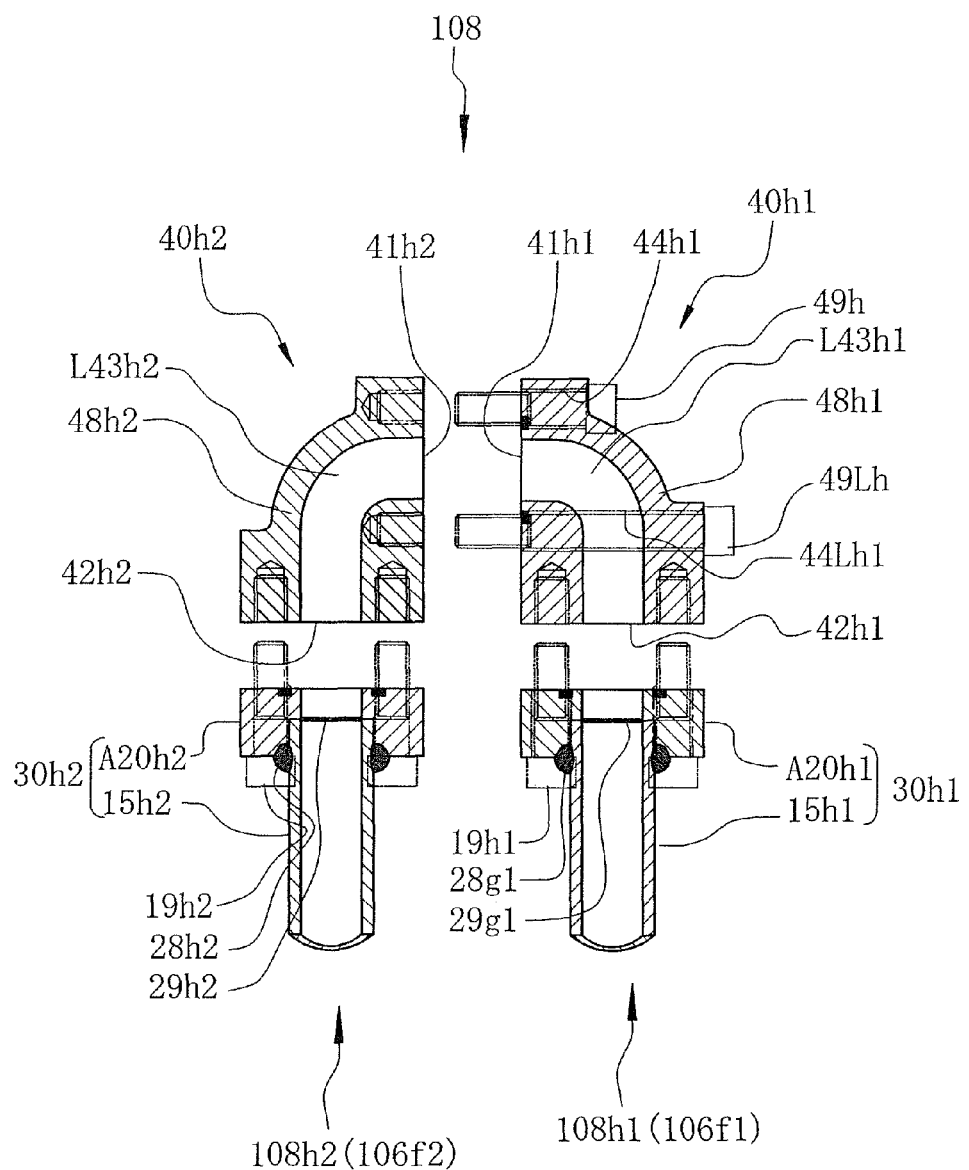
FIG. 8 is a cross sectional view of a piping structure of an eighth example of the present invention.

A piping structure 108 of an eighth example shown in FIG. 8 is a U-shaped piping for turning the piping to another direction. The piping structure 108 includes a right side piping structure 108h1 having a pipe 15h1 and a left side piping structure 108h2 having a pipe 15h2, and the pipe 15h1 and the pipe 15h2 form a U-shaped piping.

The right side piping structure 108h1 has the same structure as that of the right side piping structure 106/1 of the sixth example shown in FIG. 6, and the left side piping structure 108h2 has the same structure as that of the left side piping structure 106/2. Therefore, detailed descriptions are omitted.

In the piping structure 108, the right side piping structure 108h1 is structured by connecting a pipe structure 30h1 to a connection-surface-formed joint 40h1, by using hexagon socket head cap bolts 19h1, and the left side piping structure 108h2 is structured by connecting the pipe structure 30h2 to the connection-surface-formed joint 40h2, by using hexagon socket head cap bolts 19h2.

The piping structure 108 is structured by connecting a connection surface 41h1 of the right side piping structure 108h1 and a connection surface 41h2 of the left side piping structure 108h2, by using hexagon socket head cap bolts 49h and hexagon socket head cap bolts 49Lh.

The piping structure 108 is a structure in which the connection-surface-formed joint 40h1 and the connection-surface-formed joint 40h2 are connected to each other in such a manner that the pipe 15h1 and the pipe 15h2 run in the same direction, and is a structure in which the pipe 15f2 of the left side piping structure 106/2 of the sixth example shown in FIG. 6 is directed to the direction of the pipe 15f1 to form a U-shaped piping.

In the piping structure 108, the pipe 15h1 and the pipe 15h2 are arranged in the same direction via the connection-surface-formed joint 40h1 and the connection-surface-formed joint 40h2, and the interval therebetween is the pitch of the two joint structures A20h1 and 40h2, i.e., the minimum dimension.

As described, the interval between the pipe 15h1 and the pipe 15h2 arranged parallel to each other is the pitch of the two joint structures A20h1 and 40h2, i.e., the minimum dimension. Therefore, the interval is widened by interposing an intermediate joint between the connection surface 41h1 and the connection surface 41h2. Further, when the arrangement of the pipes 15h1 and 15h2 needs to be angled, the adjustment of the angle is possible by interposing an intermediate joint.

In the piping structure 108, the right side piping structure 108h1 and the left side piping structure 108h2 are connected to each other, and the pipes 15h1 and 15h2, an L-shaped communication path L43h1, and an L-shaped communication path L43h2 form a smooth passage without uneven inner surfaces, which prevents stagnation of foreign matters and the air.

Figure 9A:
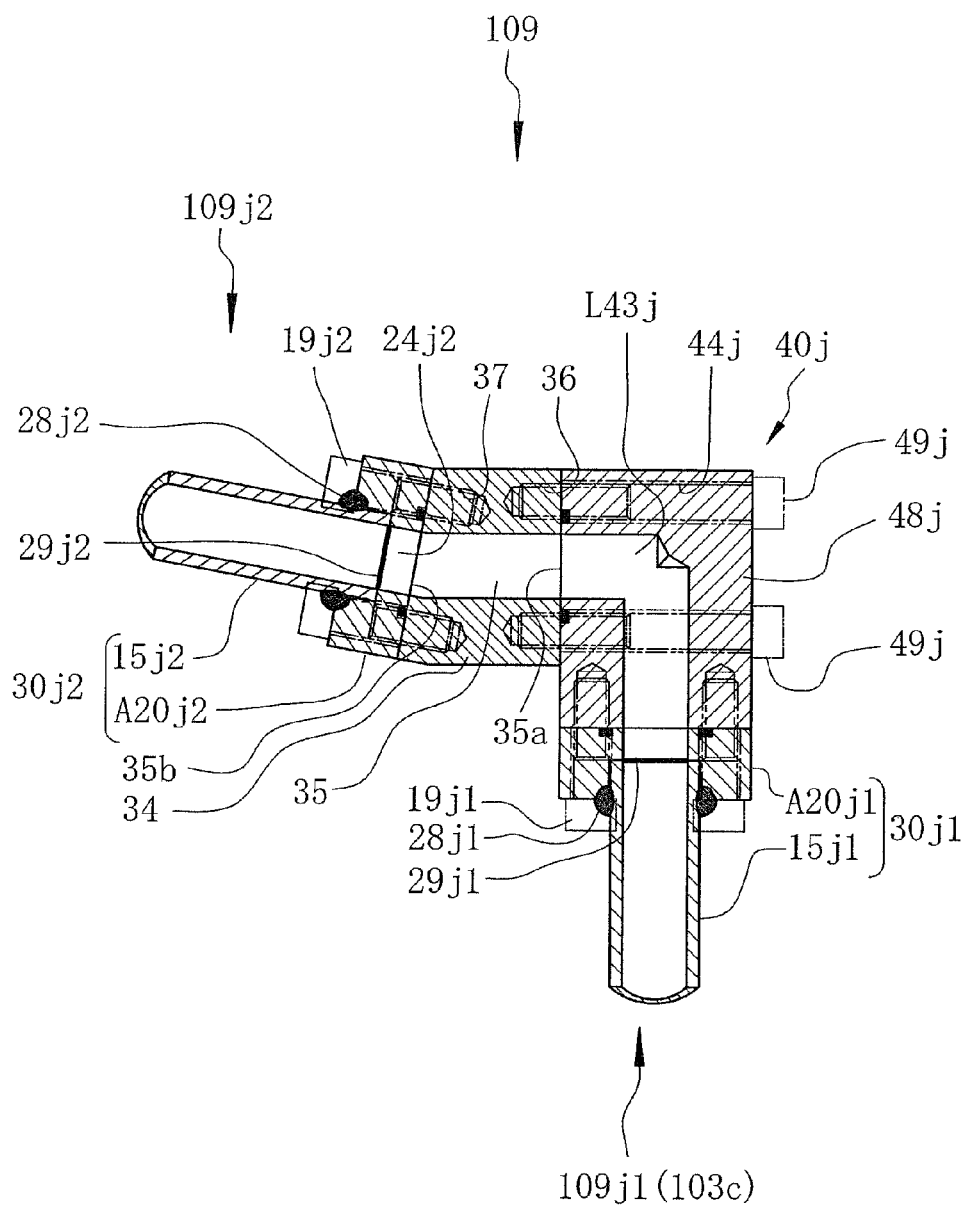
FIG. 9 (*a*) is a cross sectional view of a piping structure relative to ninth example of the present invention.
Figure 9B:
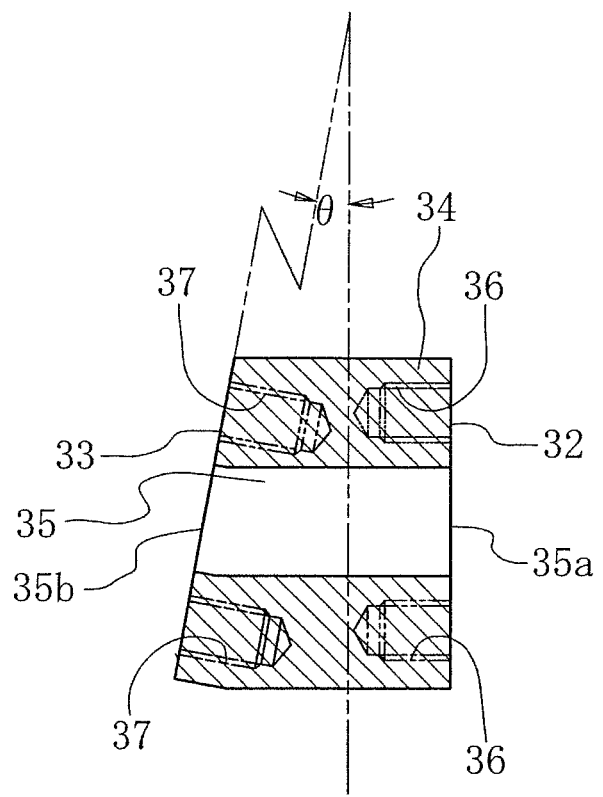

A piping structure 109 of a ninth example shown in FIGS. 9 (a) (b) has an intermediate joint 34 between a right side piping structure 109j1 and a pipe structure 30j2 so as to adjust an outlet angle of the pipe 15j2 of the pipe structure 30j2 of the left side piping structure 109j2 to a predetermined angle.

In a piping site, various angles of piping are required. However, a large number of types of joints with connection surfaces will be needed to cope with all the angles required. In view of this, the present example is intended to reduce variation in the stock. To this end, angles of the connection-surface-formed joint 40j with respect to the pipe 15j2 are measured at a piping site, and intermediate joints 34 as shown in FIG. 9 (b) corresponding to the measured angles are manufactured for the various piping.

The intermediate joint 34 includes: a path 35 having an opening parts 35a and 35b which match with an L-shaped communication path L43j of the connection-surface-formed joint 40j, and a connection hole 24j2 of the pipe structure 30j2, respectively; threaded coupling holes 36 to which hexagon socket head cap bolts 49j are screwed through the connection-surface-formed joint 40j; and coupling holes 37 serving as threaded holes to which hexagon socket head cap bolts 19j2 are screwed through the pipe structure 30j/1, the threaded coupling holes 36 and the coupling holes 37 arranged around the path 35. Further, there is provided a required angle θ between the intermediate connection surface 32 where the opening part 35a is open and the intermediate connection surface 33 where the opening part 35b is opened.

The intermediate joint 34 is manufactured at a plant based on the angle θ accurately measured at the piping site. Then, hexagon socket head cap bolts 19j having penetrated the coupling holes 44j of the connection-surface-formed joint 40j are screwed to the coupling hole 36, and hexagon socket head cap bolts 19j2 having penetrated the coupling holes 22j2 of the joint structure A20j2 of the pipe structure 30j2 are screwed to the coupling holes 37. This way, the pipe 15j2 of the pipe structure 30j2 and the pipe 15j1 of the pipe structure 30j/1 are arranged in such a manner as to match the angle at the site.

Figure 10:
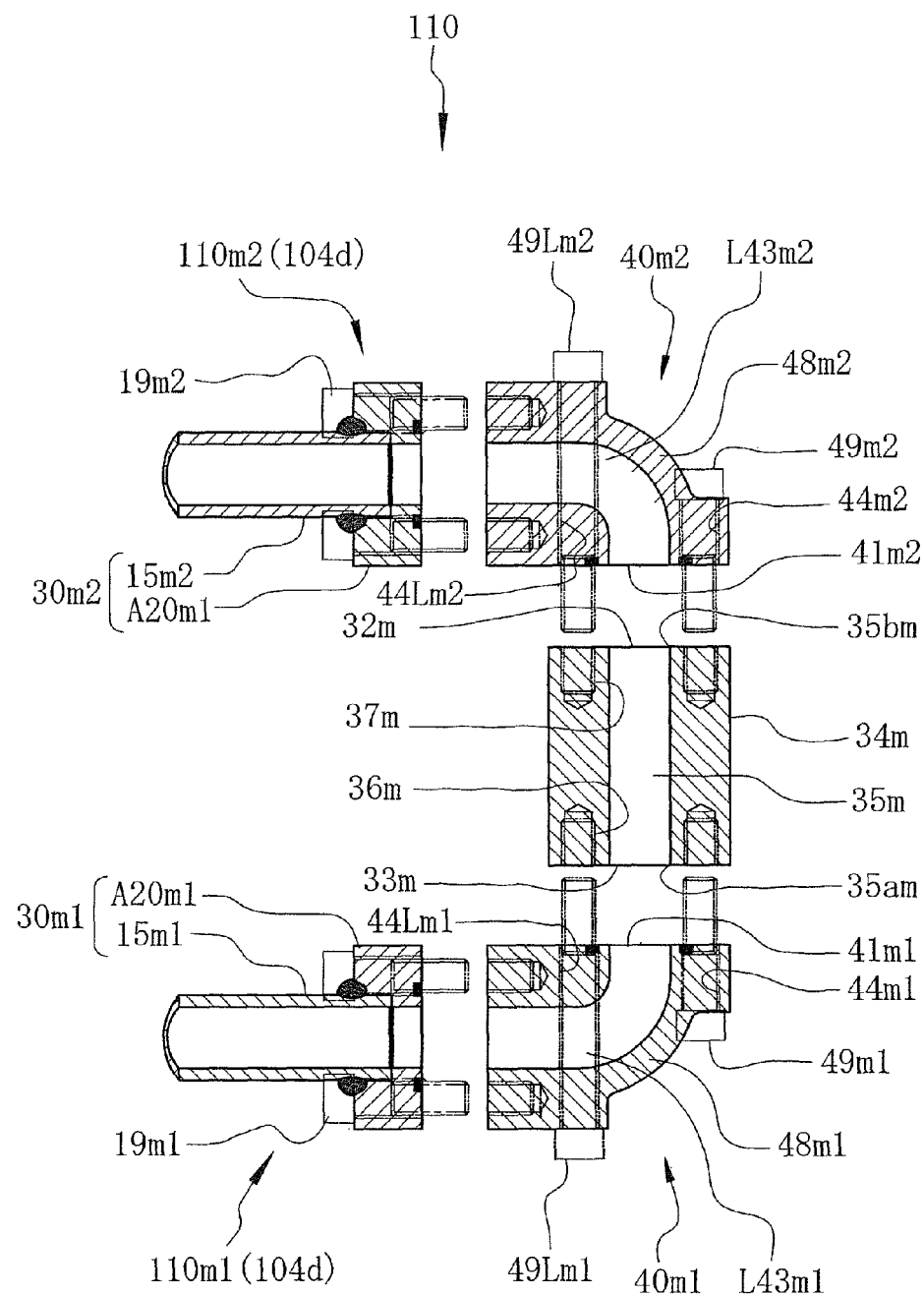
FIG. 10 is a cross sectional view of a piping structure relative to a tenth example of the present invention.

A piping structure 110 of a tenth example shown in FIG. 10 is a U-shaped piping for turning the direction of the piping to another direction. The piping structure 110 includes a lower piping structure 110m1 having a pipe 15m1 and an upper piping structure 110m2 having a pipe 15m2, and the pipe 15m1 and the pipe 15m2 form U-shaped piping.

The lower piping structure 110m1 has the same structure as that of the right side piping structure 104d of the fourth example shown in FIG. 4, and the upper piping structure 110m2 also has substantially the same structure as that of the right side piping structure 104d of the fourth example shown in FIG. 4.

The piping structure 110 is structured by interposing an intermediate joint 34m between a connection surface 41m1 of the connection-surface-formed joint 40m1 and a connection surface 41m2 of the connection-surface-formed joint 40m2, and fixing them by using hexagon socket head cap bolts 49m1 and 49Lm1 and hexagon socket head cap bolts 49m2 and 49Lm2.

The intermediate joint 34m of the tenth example has substantially the same structure as that of the intermediate joint 34 shown in FIG. 9 (b), and therefore detailed descriptions are omitted.

The connection-surface-formed joint 40m1 and the connection-surface-formed joint 40m2 of the intermediate joint 34m both have an L-shaped communication path L43m1 and an L-shaped communication path L43m2, respectively.

Further, on the end surfaces 32m and 33m of the intermediate joint 34m are provided threaded coupling holes 36m and threaded coupling holes 37m along a circle concentric with a path 35m.

The piping structure 110 is structured by connecting and fixing the lower piping structure 110m1 and the upper piping structure 110m2 to the intermediate joint 34m by connecting, to the threaded coupling holes 36m and 37m, the hexagon socket head cap bolts 49m1 and 49m2 and the hexagon socket head cap bolts 49Lm1 and 49Lm2 a little longer than the bolts 49m1 and 49m2.

The piping structure 110 enables piping suitable for the piping site, by processing the intermediate joint 34m based on a necessary distance between the pipe 15m1 and the pipe 15m2 measured at the site. It should be noted that the intermediate joint 34m is preferably adopted in cases where the distance between the pipes is longer than a total of a threaded coupling hole 36m and a threaded coupling hole 37m.

In the piping structure 110, the upper piping structure 110m1 and the lower piping structure 110m2 are connected to each other, and the pipes 15m1 and 15m2, the L-shaped communication path L43m1, the communication path 35m, and the L-shaped communication path L43m2 form a smooth passage without uneven inner surfaces, which prevents stagnation of foreign matters and the air.

Figure 11:
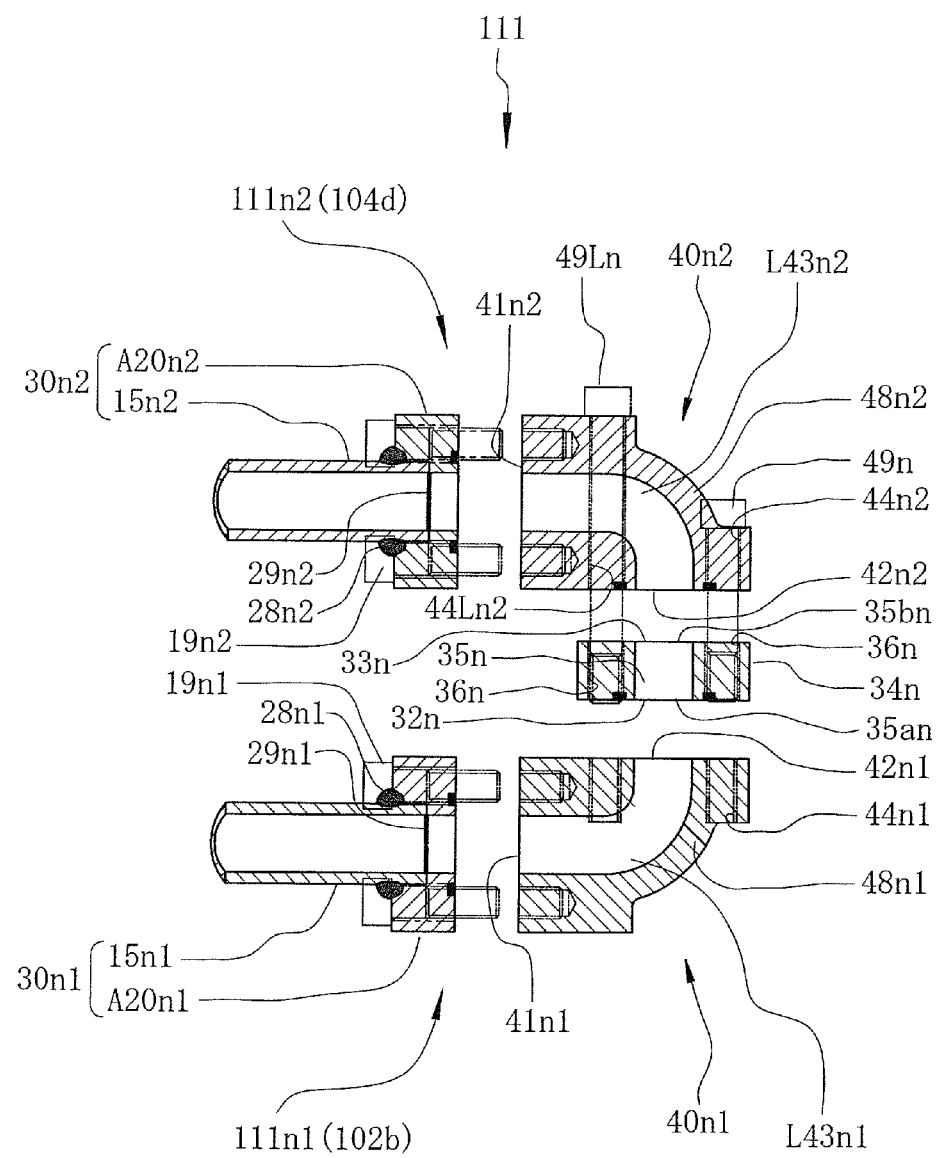
FIG. 11 is a cross sectional view of a piping structure relative to an eleventh example of present invention.

A piping structure 111 of an eleventh example shown in FIG. 11 is U-shaped piping for turning the direction of the piping to another direction. The piping structure includes a lower piping structure 111n1 having a pipe 15n1 and an upper piping structure 111n2 having a pipe 15n2, and the pipe 15n1 and the pipe 15n2 form U-shaped piping.

The lower piping structure 111n1 has the same structure as that of the right side piping structure 102b of the second example shown in FIG. 2, and the upper piping structure 111n2 has substantially the same structure as that of the right side piping structure 104d of the fourth example shown in FIG. 4. Therefore, detailed descriptions are omitted.

The piping structure 111 is structured by interposing an intermediate joint 34n between a connection surface 42n1 of a connection-surface-formed joint 40n1 and a connection surface 42n2 of a connection-surface-formed joint 40n2, and fixing the intermediate joint 34n by using hexagon socket head cap bolts 49n and hexagon socket head cap bolts 49Ln.

The intermediate joint 34n of the eleventh example includes a communication path 35n which is in communication with an L-shaped communication path L43n1 and an L-shaped communication path L43n2, of the joints 40n1 and 40n2 with connection surfaces.

Further, the end surfaces 32n and 33n of the intermediate joint 34n have coupling holes 36n arranged along a circle concentric with the communication path 35n.

The piping structure 111 of the eleventh example is structured by penetrating the hexagon socket head cap bolts 49n and the hexagon socket head cap bolt 49Ln through the coupling through holes 44Ln1 and 44n2 of the connection-surface-formed joint 40n2 and through the coupling through holes 36n of the intermediate joint 34n, and connecting the leading ends of the bots to the threaded coupling holes 44n1 of the connection-surface-formed joint 40n1, thus fixing the lower piping structure 111n1 and the upper piping structure 111n2 to the intermediate joint 34n.

The piping structure 111 enables piping suitable for the piping site, by processing the intermediate joint 34n based on a necessary distance between the pipe 15n1 and the pipe 15n2. It should be noted that the intermediate joint 34n is preferably adopted in cases where the distance between the pipes is shorter than the threaded coupling hole 44n1.

In the piping structure 111, the lower piping structure 111n1 and the upper piping structure 111n2 are connected to each other, and the pipe 15n1, the L-shaped communication path L43n1, the L-shaped communication path L43n2, and the pipe 15n2 form a smooth passage without uneven inner surfaces, which prevents stagnation of foreign matters and the air.

Figure 13A:
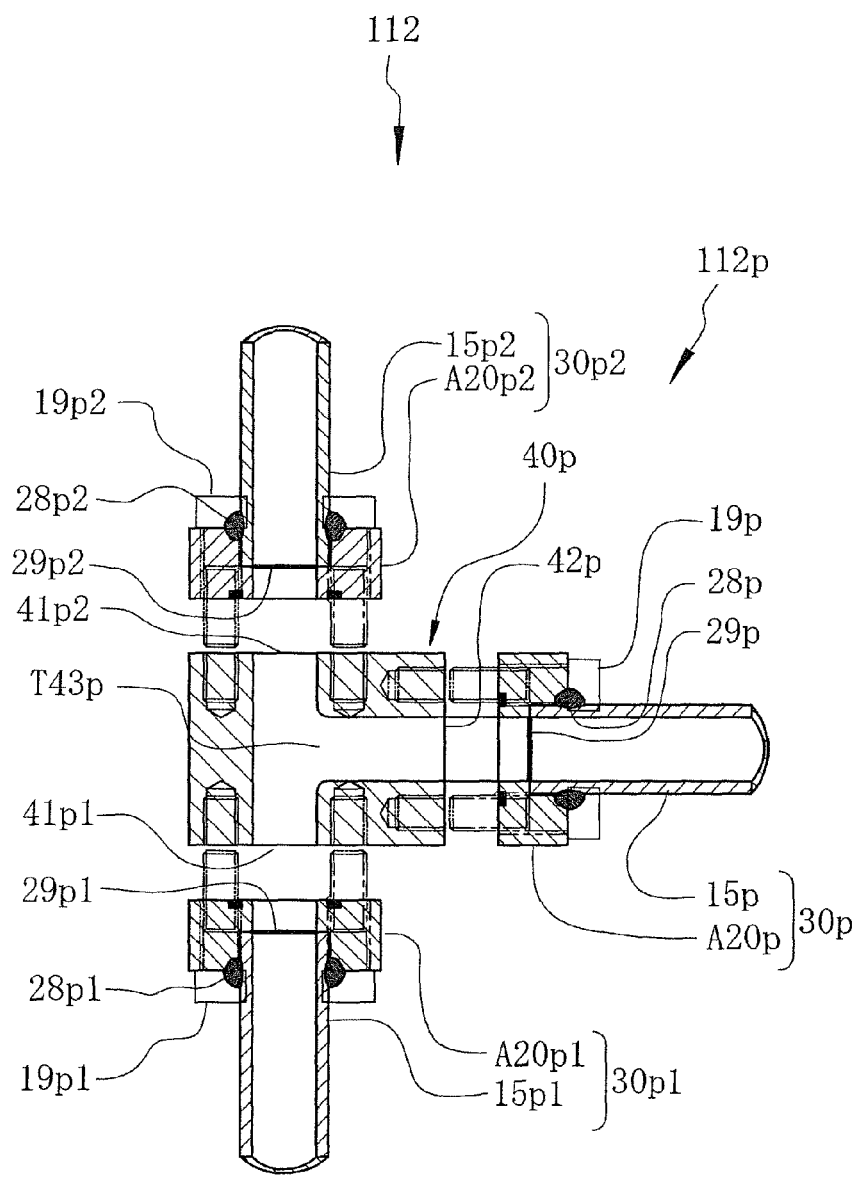
FIG. 13 (*a*) is a cross sectional view of a piping structure relative to a twelfth example of the present invention.
Figure 13B:
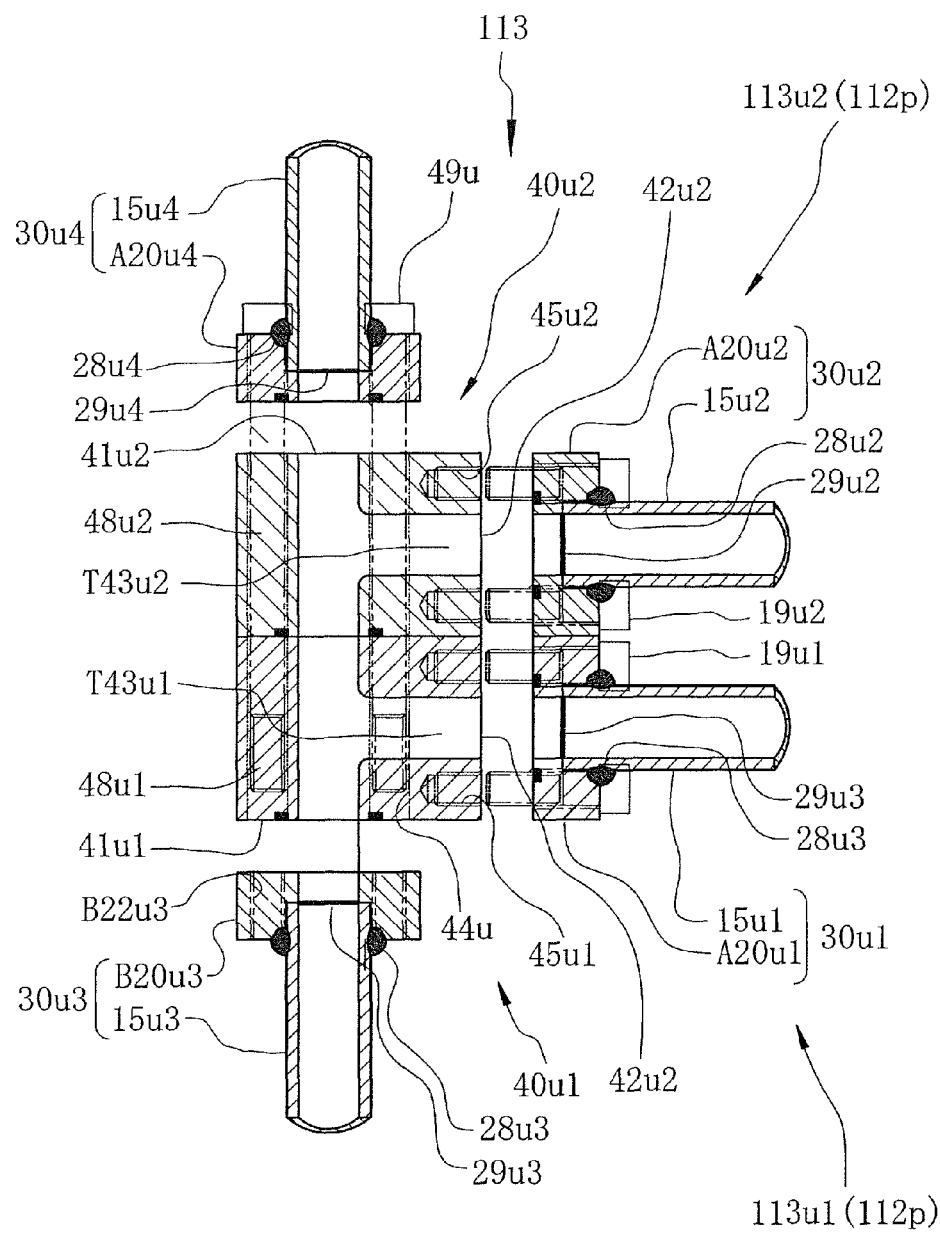

A piping structure 112 of a twelfth example shown in FIG. 13 (a) is a T-shaped piping for branching the direction of piping, and in a T-shaped piping structure 112p structuring the piping structure 112, a pipe structure 30p1 is fixed to a T-shaped connection-surface-formed joint 40p1 by using hexagon socket head cap bolts 19p1, and fixing the pipe structure 30p2 to the same by using hexagon socket head cap bolts 19p2.

The T-shaped connection-surface-formed joint 40p has a T-shaped communication path T43p which connects to the pipe structure 30p1, the pipe structure 30p2, and the pipe structure 30p.

The T-shaped communication path T43p is connected to the pipe 15p1 of the pipe structure 30p1, the pipe 15P2 of the pipe structure 30p2, and the pipe 15p of the pipe structure 30p, to branch the pipe structure 30p to two directions including the pipe 15p2 of the pipe structure 30p1 and the pipe 15p2.

The connection surface 42p to which the pipe structure 30p of the connection-surface-formed joint 40p is connected has the same shape as that of the connection surface 41 shown in FIG. 1 (f), and the connection surfaces 41p1 and 41p2 to which pipe structures 30p1 and 30p2 are connected each has the same shape as that of the connection surface 42 shown in FIG. 1 (e). Therefore, detailed descriptions are omitted.

In the piping structure 112, the pipe structure 30p1 is fixed to the connection surface 41p1 of the T-shaped connection-surface-formed joint 40p of the piping structure 112p by using hexagon socket head cap bolts 19p1, and the pipe structure 30p2 is connected to the connection surface 41p2 of the T-shaped connection-surface-formed joint 40p by using hexagon socket head cap bolts 19p2 so that a fluid flowing into the pipe 15p of the pipe structure 30p is branched to the pipe 15p1 and the pipe 15p2.

The T-shaped connection-surface-formed joint 40p of the piping structure 112 of the twelfth example having the above-described structure, the pipe structure 30p1, the pipe structure 30p2, and the pipe structure 30p to be connected to this connection-surface-formed joint 40p form a smooth branched path without uneven inner surfaces, which prevents stagnation of foreign matters.

A piping structure 113 of a thirteenth example shown in FIG. 13 (b) includes a lower piping structure 113u1 and an upper piping structure 113u2 which are serially connected to form a multiple-branched piping to branch off the path into multiple directions. The lower piping structure 113$u$1 and the upper piping structure 113$u$2 each of which branches the path into multiple directions have substantially the same structure as that of the piping structure 112$p$ of the twelfth example.

In the piping structure 113 of the thirteenth example, a connection-surface-formed joint 40$u$1 structuring the lower piping structure 113$u$1 and a connection-surface-formed joint 40$u$2 structuring the upper piping structure 113$u$2 are stacked. A pipe structure 30$u$3 is arranged on a lower connection surface 41$u$1 of the connection-surface-formed joint 40$u$1, and a pipe structure 30$u$4 is arranged on an upper connection surface 41$u$2 of the connection-surface-formed joint 40$u$2.

Of the piping structure 113 of the thirteenth example, the pipe structure 30$u$3 arranged below the piping structure 113$u$1 and the pipe structure 30$u$4 arranged above the pipe structure 113$u$2 are connected as follows. Namely, hexagon socket head cap bolts 49$u$ penetrate the pipe structure 30$u$3, the connection-surface-formed joint 40$u$1, the connection-surface-formed joint 40$u$2, and their leading ends are connected to the threaded coupling holes B22$u$3 of the pipe structure 30$u$3.

The piping structure 113 of the thirteenth example branches a fluid flowing into the pipe 15$u$1 of the pipe structure 30$u$1 connected to the piping structure 113$u$1 into three directions; i.e., the pipe 15$u$2 to pipe 15$u$4.

The pipe structures 30$u$1 to 30$u$4, the T-shaped communication path T43$u$1, and the T-shaped communication path T43$u$2 of the piping structure 113 of the thirteenth example having the above-described structure forma smooth passage without uneven inner surfaces.

Figure 14A:
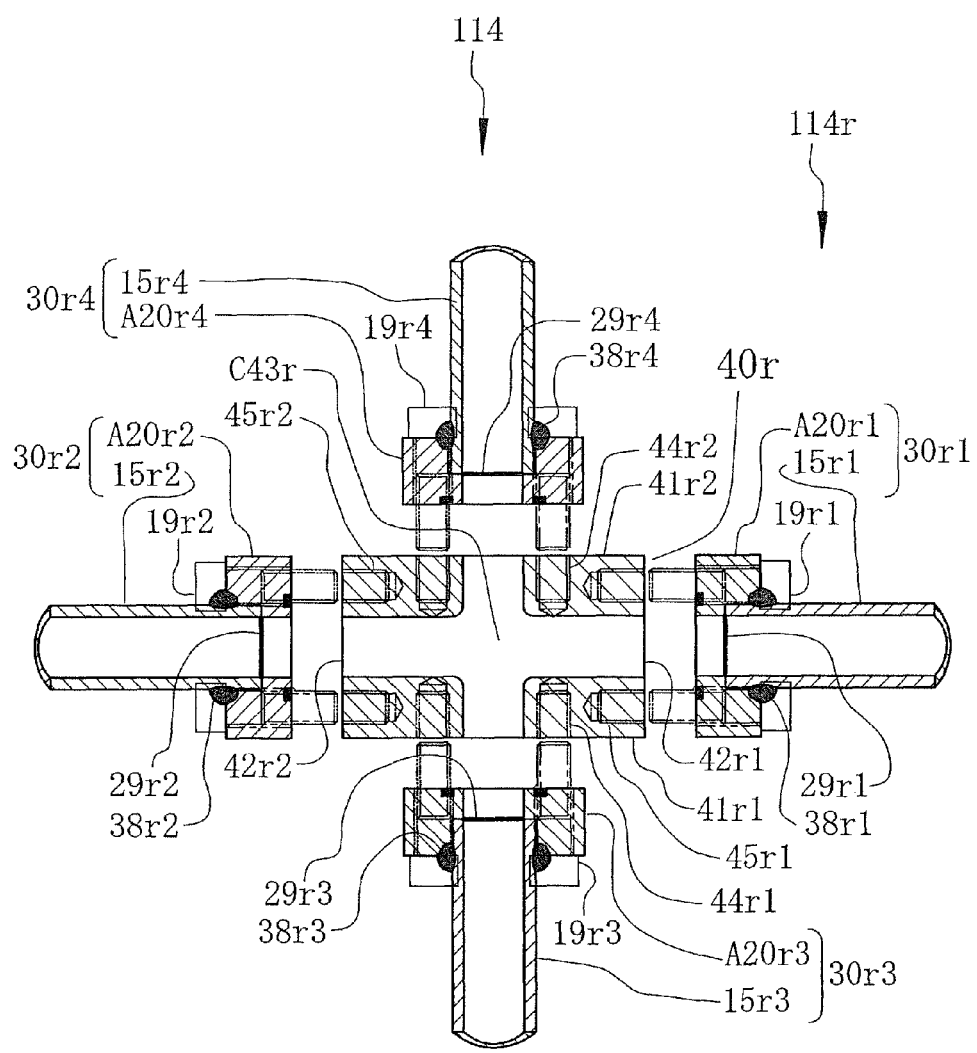
FIG. 14 (*a*) is a cross sectional view of a piping structure relative to a fourteenth example of the present invention.
Figure 14B:
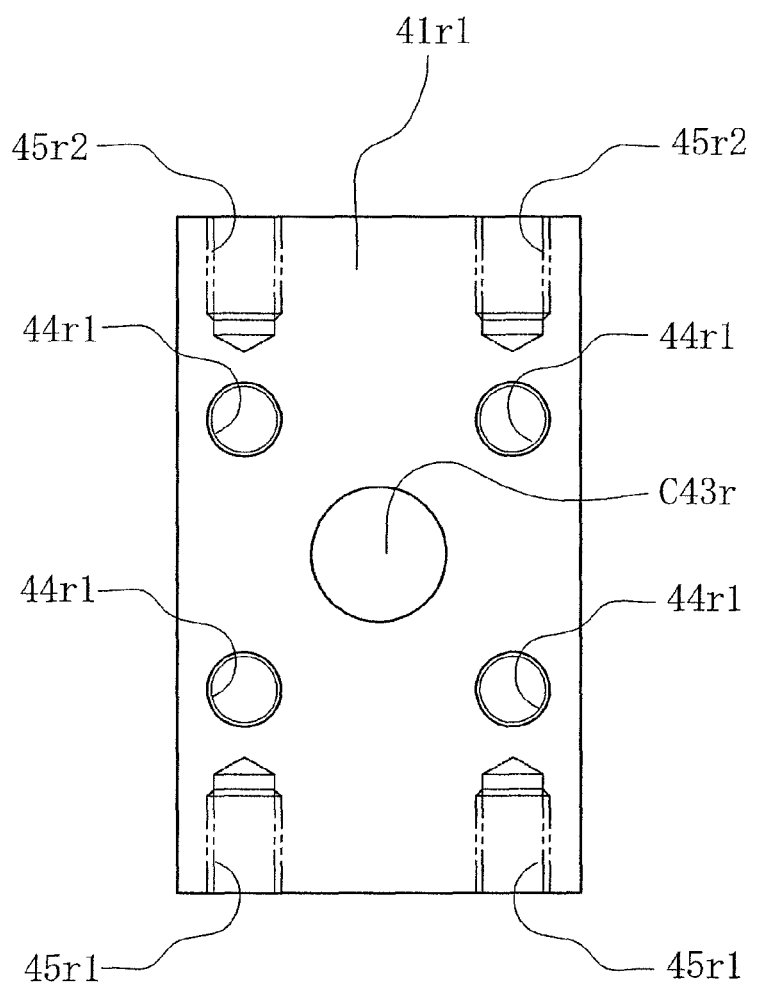
Figure 14C:
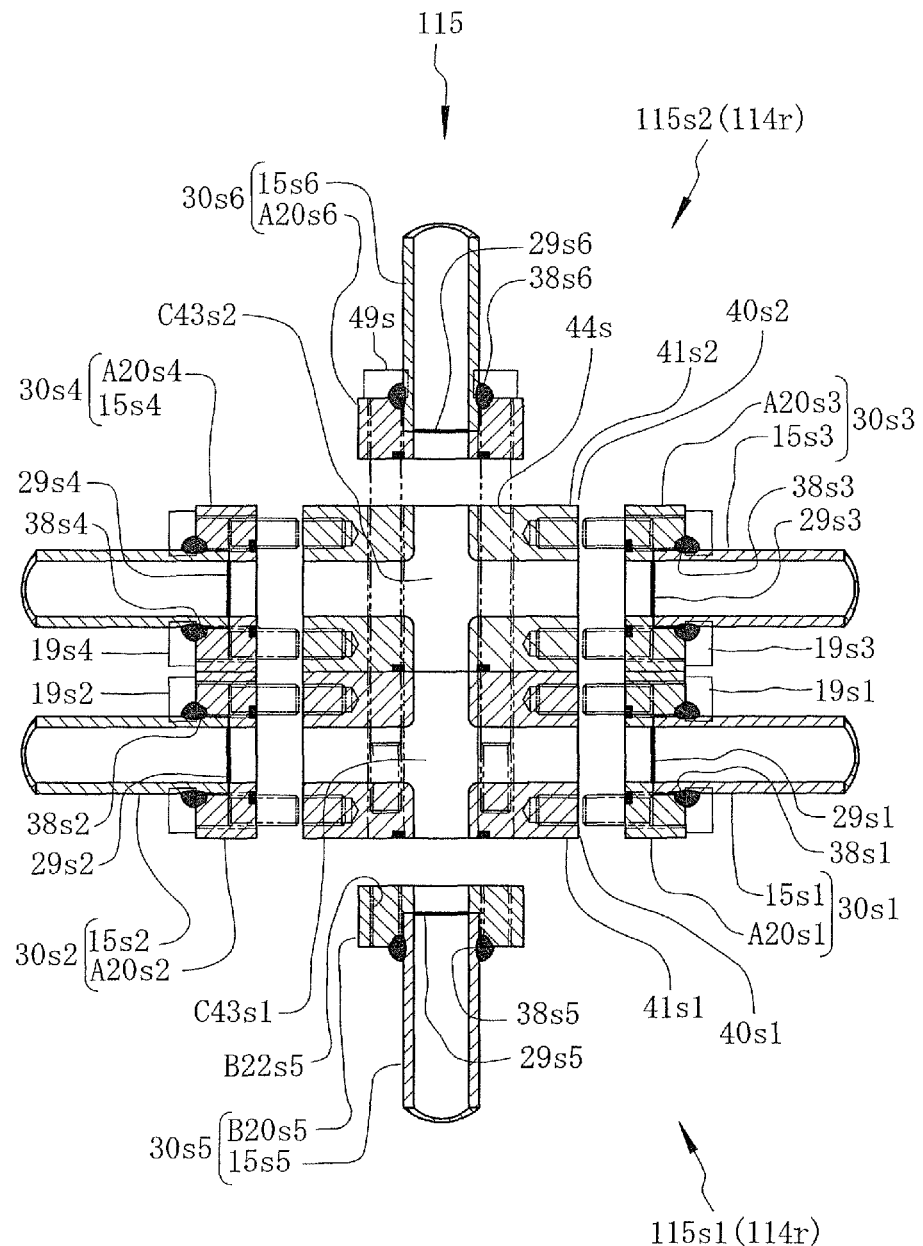

A piping structure 114 of a fourteenth example shown in FIG. 14 ($a$) is a branched piping for branching a path into multiple directions. In the piping structure 114$r$ in which a path is branched into multiple directions, a pipe structure 30$r$1 and a pipe structure 30$r$2 are fixed to the cross-shaped connection-surface-formed joint 40$r$ by using hexagon socket head cap bolts 19$r$1 and hexagon socket head cap bolts 19$r$2.

The cross-shaped connection-surface-formed joint 40$r$ includes a cross-shaped communication path C43$r$ which connects to a pipe 15$r$1 of the pipe structure 30$r$1, a pipe 15$r$2 of the pipe structure 30$r$2, a pipe 15$r$3 of a pipe structure 30$r$3, and a pipe 15$r$4 of a pipe structure 30$r$4.

The pipe structure 30$r$1 and the pipe structure 30$r$2 are connected to both ends of one of paths forming the cross-shaped communication path C43$r$, and the pipe structure 30$r$3 and the pipe structure 30$r$4 are connected to the other one of paths forming the cross-shaped communication path C43$r$. This way, the cross-shaped communication path C43$r$ branches a flow in the pipe 15$r$1 into three directions, i.e., the pipe 15$r$2, the pipe 15$r$3, and the pipe 15$r$4.

The connection surface 42$r$1 to which the pipe structure 30$r$1 of the connection-surface-formed joint 40$r$ is connected has the same square shape as that of the connection surface 42 shown in FIG. 1 ($f$), and the connection surface 42$r$2 to which the pipe structure 30$r$2 of the connection-surface-formed joint 40$r$ is connected has the same square shape as that of the connection surface 42 shown in FIG. 1 ($f$).

Further, the connection surface 41$r$1 which connects to the pipe structure 30$r$3 has threaded coupling holes 44$r$1. The threaded coupling holes 44$r$1 are arranged along a circle concentric with the cross-shaped communication path C43$r$ as shown in FIG. 14 ($b$). To these threaded coupling holes 44$r$1 are connected hexagon socket head cap bolts 19$r$3 via the pipe structure 30$r$3. Further, the connection surface 41$r$1 has a rectangular shape with additional length corresponding to the depth of the coupling holes 45$r$ formed on the connection surfaces 42$r$1 and 42$r$2.

The connection surface 41$r$2 has threaded coupling holes 44$r$2. The threaded coupling holes 44$r$2 are arranged along a circle concentric with the cross-shaped communication path C43$r$ as shown in FIG. 14 ($b$). To these threaded coupling holes 44$r$2 are connected hexagon socket head cap bolts 19$r$4 via the pipe structure 30$r$3. Further, the connection surface 41$r$2 has a rectangular shape with additional length corresponding to the depth of the coupling holes 45$r$1 formed on the connection surfaces 42$r$1 and 42$r$2.

In the piping structure 114 of the fourteenth example, the pipe structure 30$r$1 is connected to the connection surface 42$r$1 by using the hexagon socket head cap bolts 19$r$1, the pipe structure 30$r$2 is connected to the connection surface 42$r$2 by using the hexagon socket head cap bolts 19$r$2, and the pipe structure 30$r$3 is connected to the connection surface 41$r$ by using the hexagon socket head cap bolts 19$r$3. This way, a fluid flowing into the pipe 15$r$1 of the pipe structure 30$r$1 is branched into three directions, i.e., the pipe 15$r$2 to pipe 15$r$4.

The connection-surface-formed joint 40$r$ of the piping structure 114 of the fourteenth example having the above described structure and the pipe structure 30$r$1 to pipe structure 30$ar$4 connecting to the connection-surface-formed joint 40$r$ form branched paths without uneven inner surfaces, which prevents stagnation of foreign matters.

A piping structure 115 of a fifteenth example shown in FIG. 14 ($c$) is a multiple branching piping in which a lower piping structure 115$s$1 and a upper piping structure 115$s$2 are serially connected to branch a path into multiple directions. The piping structures 115$s$1 and 115$s$2 which branches the path into multiple directions each have substantially the same structure as that of the piping structure 114$r$ of the fourteenth example which forms a cross shaped branching.

In the piping structure 115 of the fifteenth example shown in FIG. 14 ($c$), a connection-surface-formed joint 40$s$1 and a connection-surface-formed joint 40$s$2, which structure the piping structures 115$s$1 and 115$s$2, are stacked. On a connection surface 41$s$1 which is a lower surface of the connection-surface-formed joint 40$s$1 is arranged a pipe structure 30$s$5, and on a connection surface 41$s$2 which is the upper surface of the connection-surface-formed joint 40$s$2 is arranged a pipe structure 30$s$6.

The pipe structure 30$s$5 arranged below the piping structure 115$s$1 and the pipe structure 30$s$6 arranged above the piping structure 115$s$2 are fastened by connecting leading ends of hexagon socket head cap bolts 49$s$ penetrating the pipe structure 30$s$6, the connection-surface-formed joint 40$s$2, the connection-surface-formed joint 40$s$1 to threaded coupling holes B22$s$5 of the pipe structure 30$s$5.

In the piping structure 115 having the above-described structure, a fluid flowing into the pipe 15$s$1 of the pipe structure 30$s$1 connected to the piping structure 115$s$1 is branched into five directions, i.e., to the pipe 15$s$2 to the pipe 15$s$6.

The pipe structures 30$s$1 to 30$s$6 of the piping structure 115, the cross-shaped communication path C43$s$1, the cross-shaped communication path C43$s$2 form smooth branched paths without uneven inner surfaces. This prevents stagnation of foreign matters.

Figure 15:
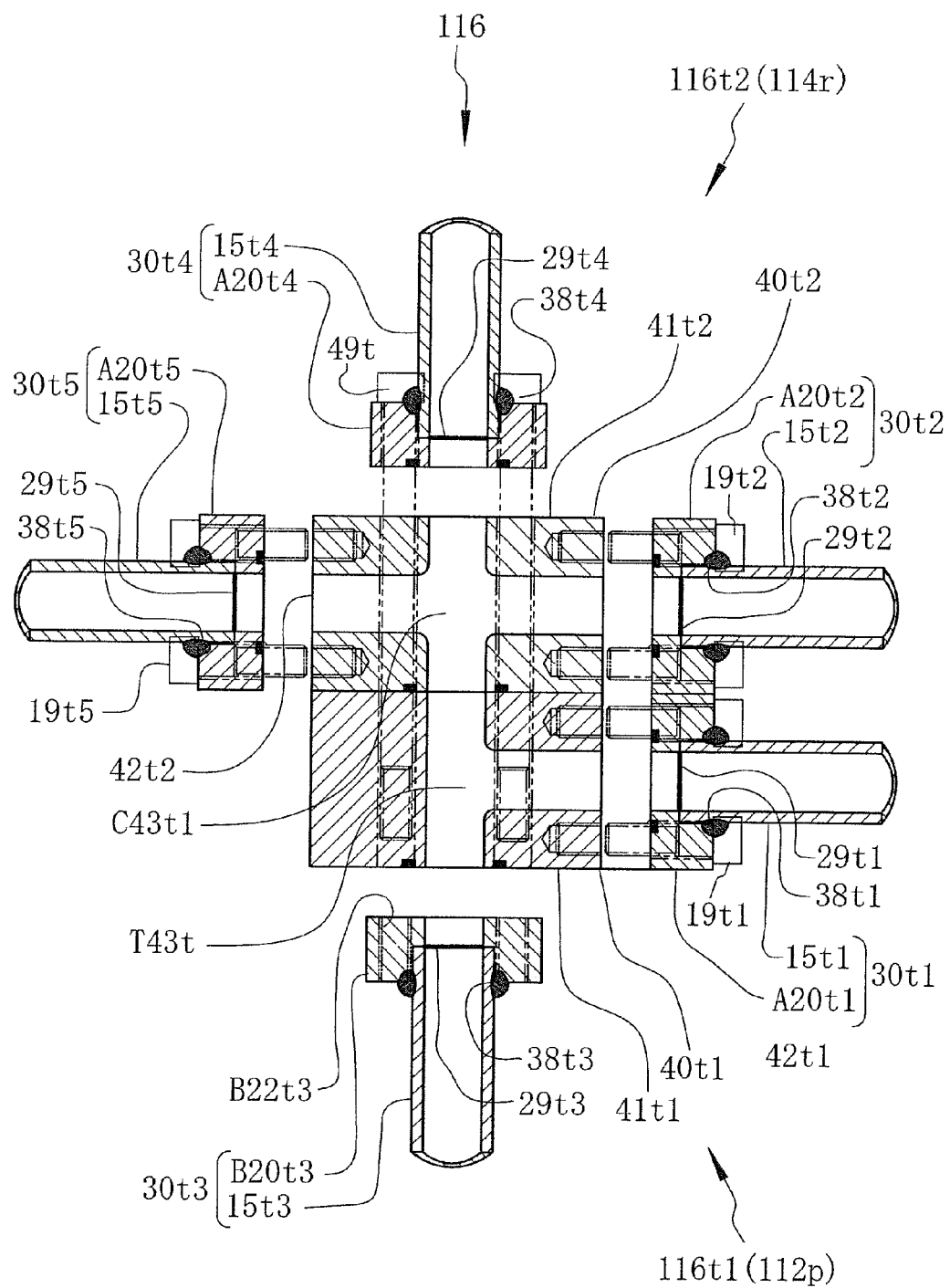
FIG. 15 is a cross sectional view of a piping structure relative to a sixteenth example of the present invention.
Figure 16:
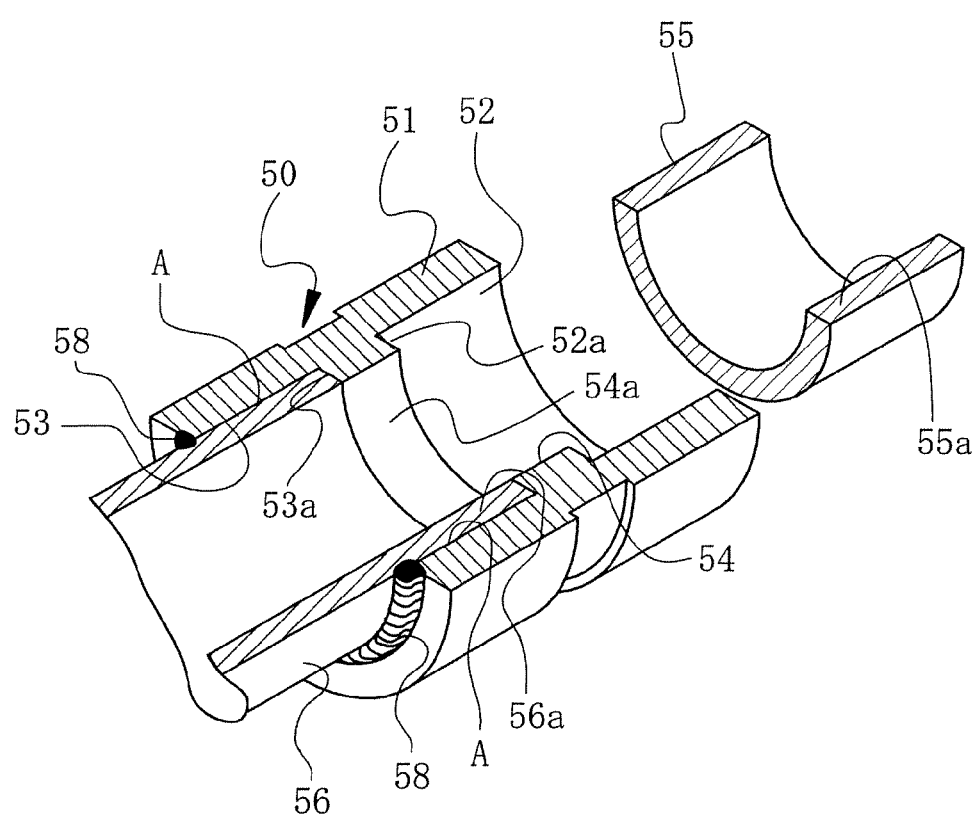
FIG. 16 is a partially enlarged cross sectional view of a traditional pipe structure.
Figure 17:
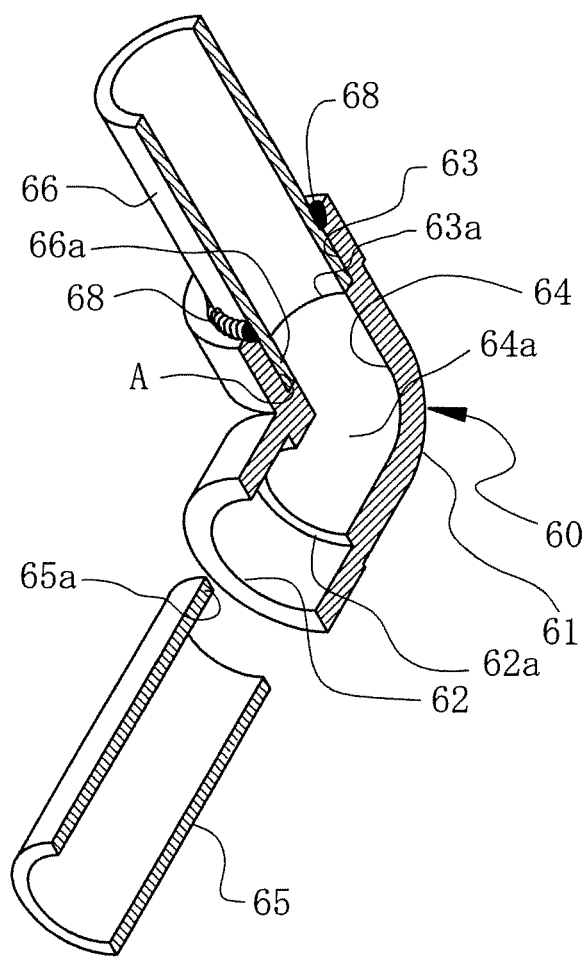
FIG. 17 is a partially enlarged cross sectional view of a traditional pipe structure.
Figure 18A:
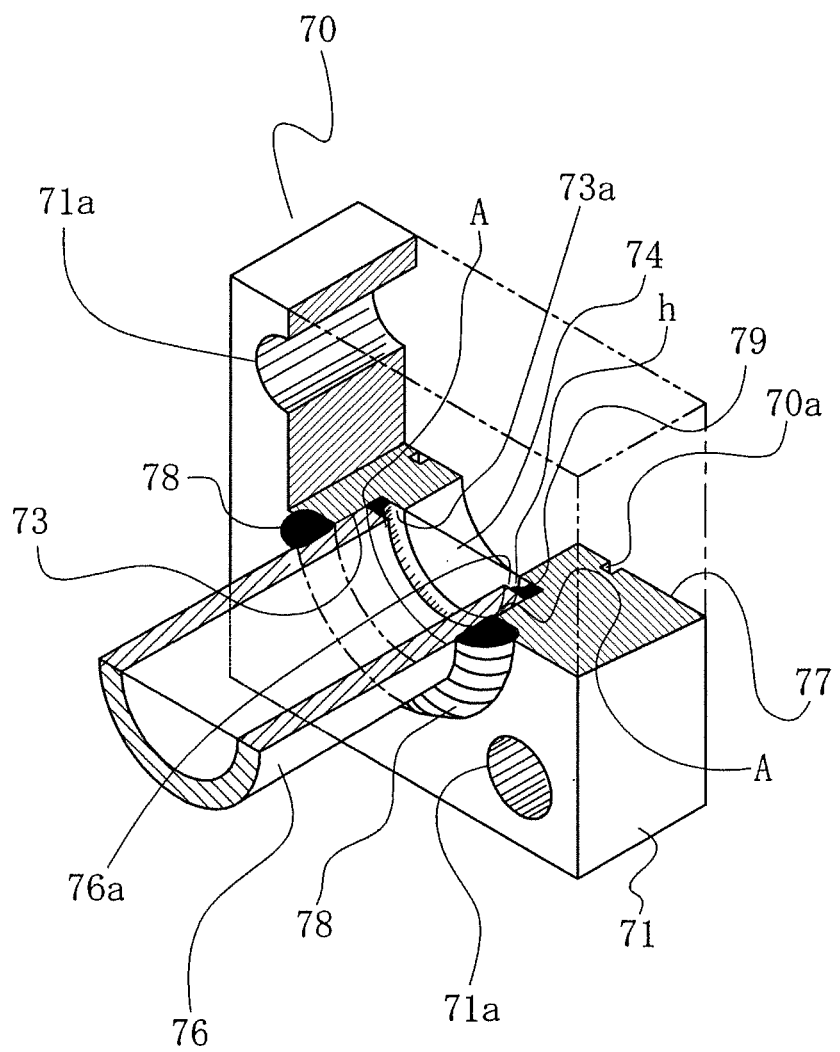
FIG. 18(*a*) is a partially enlarged cross sectional view of a traditional pipe structure.
Figure 18B:
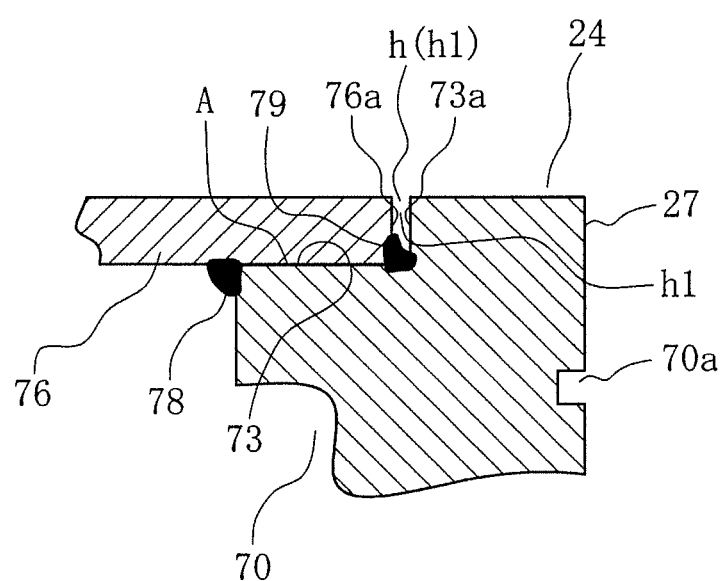
Figure 19:
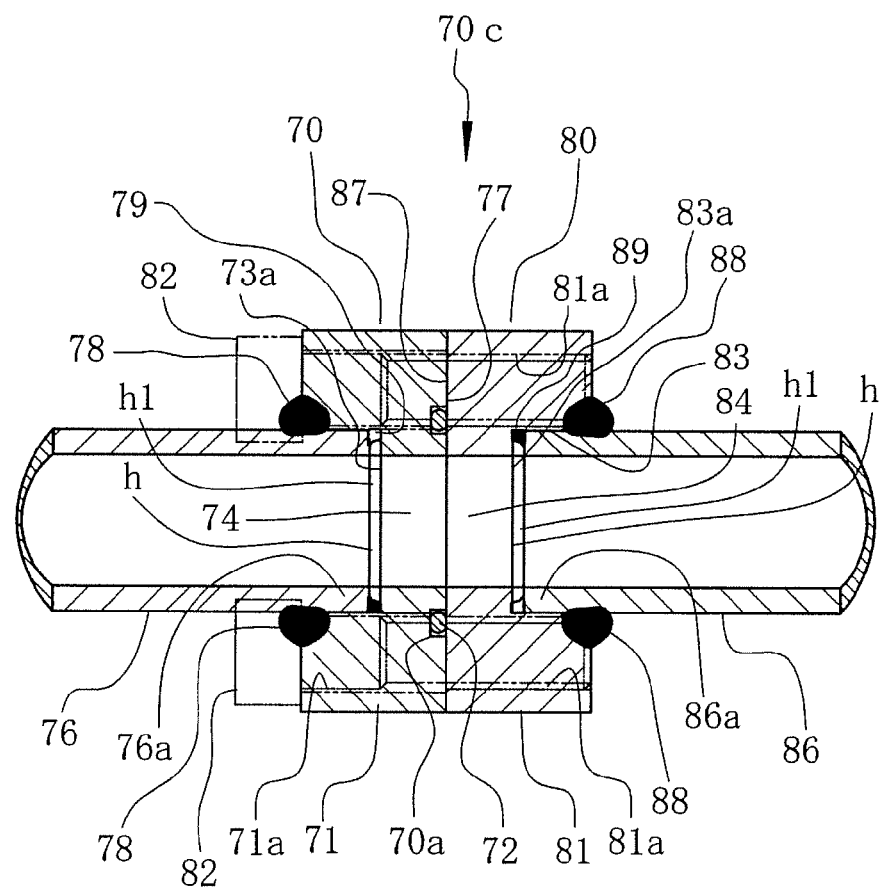
FIG. 19 is a cross sectional view of a traditional piping structure.

A piping structure 116 of a sixteenth example shown in FIG. 15 is a multiple branching piping in which a lower piping structure 116$t$1 and a upper piping structure 116$t$2 are serially connected to branch a path into multiple directions.

The piping structure 116 of the sixteenth example shown in FIG. 15 includes a piping structure 116t1 having substantially the same structure as that of the piping structure 112p of the thirteenth example shown in FIG. 13 (a), and a piping structure 116t2 having substantially the same structure as that of the piping structure 114r of the twelfth example shown in FIG. 14 (a).

In the piping structure 116 of the sixteenth example, joints 40t1 and 40t2 with connection surfaces, which structure the piping structure 116t1 and the piping structure 116t2, are stacked. On a connection surface 41t1 which is the lower surface of the connection-surface-formed joint 40t1 is arranged a pipe structure 30t3, and on a connection surface 42t2 which is the upper surface of the connection-surface-formed joint 40t2 is arranged a pipe structure 30t4. Furthermore, a pipe structure 30t5 is also fixed to the connection-surface-formed joint 40t2.

In the piping structure 116 of the sixteenth example, the connection-surface-formed joint 40t1 of the piping structure 116t1 and the joint 40t2 with connection surface of the piping structure 116t2 are structured by connecting leading ends of hexagon socket head cap bolts 49t penetrating these parts to threaded coupling holes B22t3 of the pipe structure 30t3.

In the piping structure 116 having the above-described structure, a fluid flowing into the pipe 15t1 of the pipe structure 30t1 connected to the piping structure 116t1 is branched into four directions, i.e., to the pipe 15t2 to the pipe 15t5.

The pipe structures 30t1 to 30s5, the cross-shaped communication path C43t1, and the T-shaped communication path T43t2 of the piping structure 116 having the above-described structure form a smooth branched paths without uneven inner surfaces. This prevents stagnation of foreign matters.

The main body 48b of the connection-surface-formed joint 40b of the second example shown in FIG. 2 is made by casting. The connection surface 41 of the L-shaped communication path L43b, the opening ends 43b1 and 43b2 of the connection surfaces 42 are machined so as to smoothen their casting surfaces and facilitate specification of the center.

The connection surface 41b of the L-shaped communication path L43b and the opening ends 43b1 and 43b2 of the connection surface 42b are machined slightly to the extent that the casting surfaces are removed, and form a taper shape with a small diameter from the opening ends towards the inside.

The four coupling holes 44b and 45b provided to the connection surfaces 41b and 42b of the connection-surface-formed joint 40b of the second example shown in FIG. 2 are processed so that their centers are the centers of the opening ends 43b1 and 43b2 whose casting surfaces have been machined.

Where one of the connection surfaces connected to each other has threaded coupling holes, the other one has through holes. Each of the through holes has a diameter slightly greater than that of the threaded hole (11 mm in cases of 10 mm screws).

The opening ends on the connection surfaces to be connected are matched as follows. Namely, a guide screw whose head part has slightly smaller diameter than that of the coupling through hole is screwed into the threaded coupling holes out of those along a diagonal line. These guide screws are inserted into the coupling through holes to match the opening ends on the two connection surfaces.

Next, hexagon socket head cap bolts are screwed into and fixed to the other two threaded coupling holes. Then, the guide screws are taken off and hexagon socket head cap bolts are screwed in and fixed, thereby accurately matching the opening ends of the connection surfaces.

The above described processing is applied to all the joints with connection surfaces whose main body is casted. The smooth casting surfaces unique in casting articles are maintained and the communication paths are accurately matched at their connection surfaces. This realizes a smooth path which prevents stagnation of foreign matters.

The examples above deal with a piping structure in which a connection-surface-formed joint and a pipe structure are combined. The use of the connection-surface-formed joint also include direct connection to an input/output port of hydraulic equipment (a hydraulic cylinder, a hydraulic pump, a hydraulic motor, directional control valve).

Connecting the connection-surface-formed joint directly to an input/output port of hydraulic equipment brings about an effect of minimize the radius of curvature to a half of that of the connection surfaces.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

10 Piping Structure
13 Gap
14 Leading End
15 Pipe
16 Inner Diameter
17 End Portion
18 Outer Circumference
19 Hexagon Socket Head Cap Bolt (Bolts)
A20 Pipe Joint (Joint Structure)
B20 Pipe Joint (Joint Structure)
A22 Coupling Hole (Structured by a Through Hole or a Threaded Hole)
B22 Coupling Hole (Structured by a Threaded Hole)
23 Contact Surfaces
231 Pipe Insertion Hole
24 Connection Hole
27 Connection Surface
28 Weld Portion (Weld Portion)
29 Weld Portion
30 Pipe Structure
32 Intermediate Connection Surface
33 Intermediate Connection Surface
34 Intermediate Structural Joint
35 Path 35
36 Coupling Hole (Structuring a Threaded Hole)
37 Coupling Hole (Structuring a Threaded Hole)
39 O-Ring
40 Structural Joint
41 Connection Surface (First Connection Surface)
42 Connection Surface (Second Connection Surface)
43 Communication Path
44 Coupling Hole (First Coupling Hole)
45 Coupling Hole (Second Coupling Hole)
46 Opening End (First Opening End)
47 Opening End (Second Opening End)
48 Main Body A Gap
L30 Length of Pipe Structure

The invention claimed is:

1. A joint having connection surface, comprising a main body including:
- a first connection surface and a second connection surface, each of which is structured to connect to a connection target such as a port of hydraulic equipment, a piping, and a joint, the connection target having a path in which a hydraulic oil flows;
- a first opening end opened on the first connection surface and connecting to the path;
- first coupling holes each structured as a threaded hole, which are opened on the first connection surface and arranged on a circle concentric with the first opening end;
- a second opening end opened on the second connection surface and connecting to the path;
- second coupling holes each structured as a through hole or a threaded hole, which are opened on the second connection surface and arranged along a circle concentric with the second opening end; and
- a communication path communicating the first opening end with the second opening end,
- wherein arrangement of the first coupling holes and that of the second coupling holes of the main body are made identical to each other, and
- wherein a first plane including the first connection surface of the main body is perpendicular to a second plane including the second connection surface, the first connection surface is a square with the first opening end as a center of the first connection surface, and the second connection surface is a rectangle including a square identical to the foregoing square with the second opening end as the center of the square, the rectangle having one side longer than a side of the square by a depth of the first coupling holes.

2. A piping structure, comprising:
a joint having a connection surface, including a main body including: a first connection surface and a second connection surface, each of which is structured to connect to a connection target such as a port of hydraulic equipment, a piping, and a joint, the connection target having a path in which a hydraulic oil flows, a first opening end opened on the first connection surface and connecting to the path, first coupling holes each structured as a threaded hole, which are opened on the first connection surface and arranged on a circle concentric with the first opening end, a second opening end opened on the second connection surface and connecting to the path, second coupling holes each structured as a through hole or a threaded hole, which are opened on the second connection surface and arranged along a circle concentric with the second opening end, and a communication path communicating the first opening end with the second opening end, wherein arrangement of the first coupling holes and that of the second coupling holes of the main body are made identical to each other, a first plane including the first connection surface of the main body is perpendicular to a second plane including the second connection surface, the first connection surface is a square with the first opening end as a center of the first connection surface, the second connection surface is a rectangle including a square identical to the foregoing square with the second opening end as the center of the square, the rectangle having one side longer than a side of the square by a depth of the first coupling holes; and a pipe with a pipe joint including the pipe structuring piping, the pipe including at a first end portion of the pipe, a first side pipe joint including a first side pipe insertion hole into which the first end portion of the pipe is inserted with a gap between the first side pipe insertion hole and the first end portion of the pipe, a first side connection hole serially provided to the first side pipe insertion hole and having a diameter corresponding to an inner diameter of the pipe, a first side connection surface on which the first side connection hole is opened, a surface on which the first side pipe insertion hole is opened, a sealing groove on the first side connection surface, which is arranged on a periphery of the first side connection hole, and coupling through holes arranged on the outer periphery of the sealing groove, along a circle concentric with the first side connection hole, wherein the first side pipe joint is fixed by welding an inner surface of the first end portion of the pipe and the inner surface of the first side connection hole, and welding the outer circumference of the pipe and the surface on which the first side pipe insertion hole is opened; and including at a second end portion of the pipe, a second side pipe joint including a second side pipe insertion hole into which said second end portion of the pipe is inserted with a gap between the second side pipe insertion hole and said second end portion of the pipe, a second side connection hole serially provided to the second side pipe insertion hole and having a diameter corresponding to the inner diameter of the pipe, a second side connection surface on which the second side connection hole is opened, a surface on which the second side pipe insertion hole is opened, and threaded coupling holes arranged on the second side connection surface along a circle concentric with the second side connection hole, which are in positions corresponding to those of the coupling through holes, wherein the second side pipe joint is fixed by welding an inner surface of said second end portion of the pipe and the inner surface of the second side connection hole, and welding the outer circumference of the pipe and the surface on which the second side pipe insertion hole is opened, and the connection surface of the joint having the connection surface and the pipe joint of the pipe with a pipe joint are being fixed by means of threaded-coupling.

* * * * *